US009826502B2

(12) United States Patent
Cherian et al.

(10) Patent No.: US 9,826,502 B2
(45) Date of Patent: Nov. 21, 2017

(54) MANAGING HANDOFF TRIGGERING BETWEEN UNICAST AND MULTICAST SERVICES

(75) Inventors: George Cherian, San Diego, CA (US); Fatih Ulupinar, San Diego, CA (US); Jun Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 13/557,099

(22) Filed: Jul. 24, 2012

(65) Prior Publication Data

US 2013/0028118 A1    Jan. 31, 2013

Related U.S. Application Data

(60) Provisional application No. 61/511,490, filed on Jul. 25, 2011.

(51) Int. Cl.
*H04W 72/00*    (2009.01)
*H04W 76/00*    (2009.01)

(52) U.S. Cl.
CPC ........ *H04W 72/005* (2013.01); *H04W 76/002* (2013.01)

(58) Field of Classification Search
CPC .. H04W 72/00; H04W 72/005; H04W 76/002
See application file for complete search history.

(56) References Cited

U.S. PATENT DOCUMENTS

| 7,620,413 | B2 | 11/2009 | Jen |
| 8,068,821 | B2 | 11/2011 | Bhatia et al. |
| 2005/0026649 | A1* | 2/2005 | Zicker et al. ............. 455/552.1 |
| 2005/0220064 | A1 | 10/2005 | Hundscheidt et al. |
| 2007/0168523 | A1* | 7/2007 | Jiang et al. .................. 709/228 |
| 2008/0281698 | A1* | 11/2008 | Whitehead ...................... 705/14 |
| 2009/0073911 | A1 | 3/2009 | Cheon et al. |
| 2010/0128646 | A1* | 5/2010 | Gao ............................. 370/312 |
| 2010/0165902 | A1 | 7/2010 | Kvernvik et al. |
| 2012/0124179 | A1* | 5/2012 | Cappio et al. ................ 709/219 |
| 2012/0182921 | A1 | 7/2012 | Tsuboi et al. |
| 2012/0320741 | A1* | 12/2012 | Freda et al. .................. 370/229 |

FOREIGN PATENT DOCUMENTS

| CN | 101647282 A | 2/2010 |
| JP | 2011061591 A | 3/2011 |
| WO | 2008119673 A1 | 10/2008 |

OTHER PUBLICATIONS

Siemens: "Information flow of bearer switching in IMS multicast services", 3GPP DRAFT; S2-070895-REV-S2-070640—Information Flow of Bearer Switching in IMS Multicast Services, Mobile Competence Centre; 650, Route Des Lucioles; F-06921 Sophia-Anti Polis Cedex; France, vol. SA WG2, No. St Louis, MO, USA; Feb. 12-15, 2007, XP050627174, [ret. Feb. 20, 2007].*

(Continued)

*Primary Examiner* — Walter Divito
(74) *Attorney, Agent, or Firm* — Anthony R. Morris

(57) ABSTRACT

A wireless communication network may provide services, e.g., multimedia services, in unicast and broadcast modes, and the mode of providing a service may depend on a level of demand. In response to changing demand for a service the network may determine that service should transition from one mode to the other, and the network, may signal such a transition to one or more terminals subscribing to the service.

49 Claims, 28 Drawing Sheets

(56) References Cited

OTHER PUBLICATIONS

3GPP TS 26.346 "3rd Generation Partnership Project; Technical Specification Group Services and System Aspects; Multimedia Broadcast/Multicast Service (MBMS); Protocols and codecs," V10.0.0, Release 10, Mar. 2011.
International Search Report and Written Opinion—PCT/US2012/048170—ISA/EPO—dated Nov. 14, 2012.
NEC: "DISC on MBMS service activation/deactivation further to counting", 3GPP DRAFT; R2-106488, 3rd Generation Partnership Project (3GPP), Mobile Competence Centre; 650, Route Des Lucioles; F-06921 Sophia-Antipolis Cedex; France, vol. RAN WG2, No. Jacksonville, USA, Nov. 8, 2010, XP050466202, [retrieved on Nov. 8, 2010].
Philips: "On the issue of switching between p2p and p2m-channels in MBMS", 3GPP DRAFT; R2-030078, 3rd Generation Partnership Project (3GPP), Mobile Competence Centre; 650, Route Des Lucioles; F-06921 Sophia-Antipolis Cedex; France, vol. RAN WG2, No. UK, Jan. 13, 2003, XP050141520, [retrieved on Jan. 13, 2003].
Taiwan Search Report—TW101126871—TIPO—May 2, 2014.
Ericsson: "Usage of GBA, MIKEY and HTTP digest for MBMS key delivery", 3GPP TSG SA WG3 Security 53#32, S3-040058, Feb. 2004, pp. 5.
Stockhammer, T., "Dynamic Adaptive Streaming Over HTTP Design Principles and Standards," Second W3c Web and TV Workshop, Jan. 22, 2011 (Jan. 22, 2011), pp. 1-3, XP007916969, Retrieved from the Internet:URL :http://www.w3.org/2010/11/web-and-tv/papers.html [retrieved on Feb. 2, 2011].

\* cited by examiner

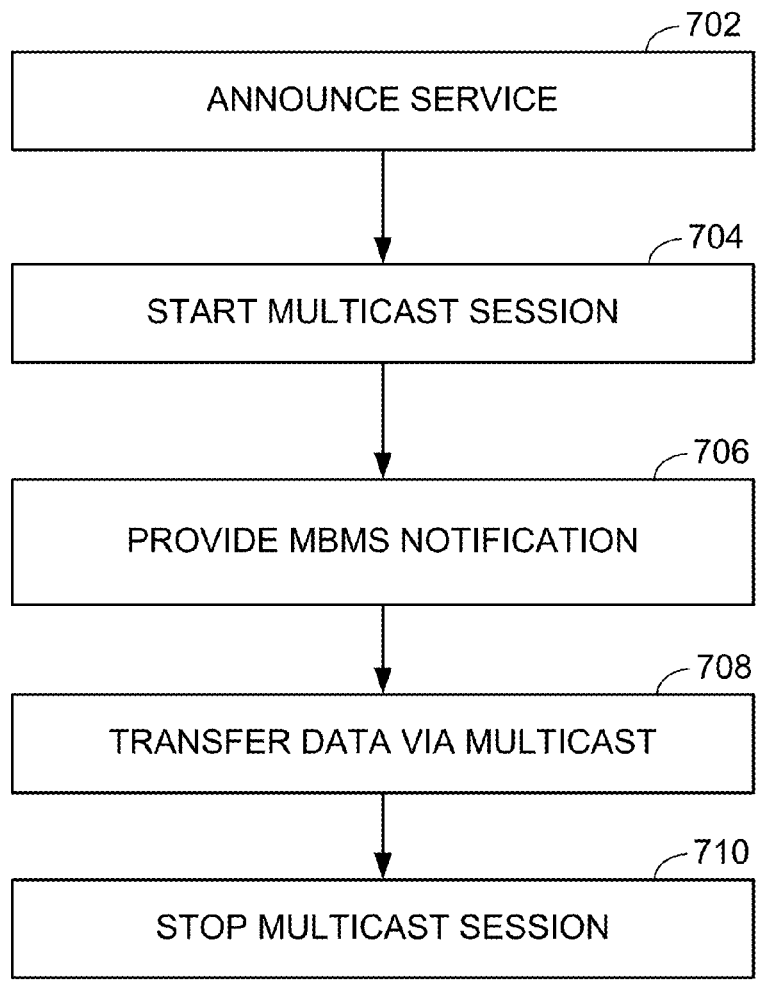
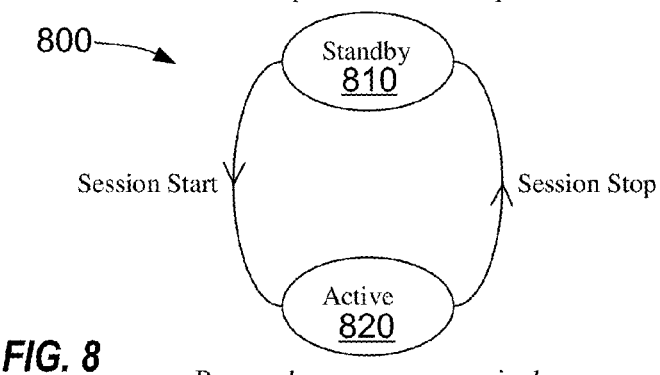

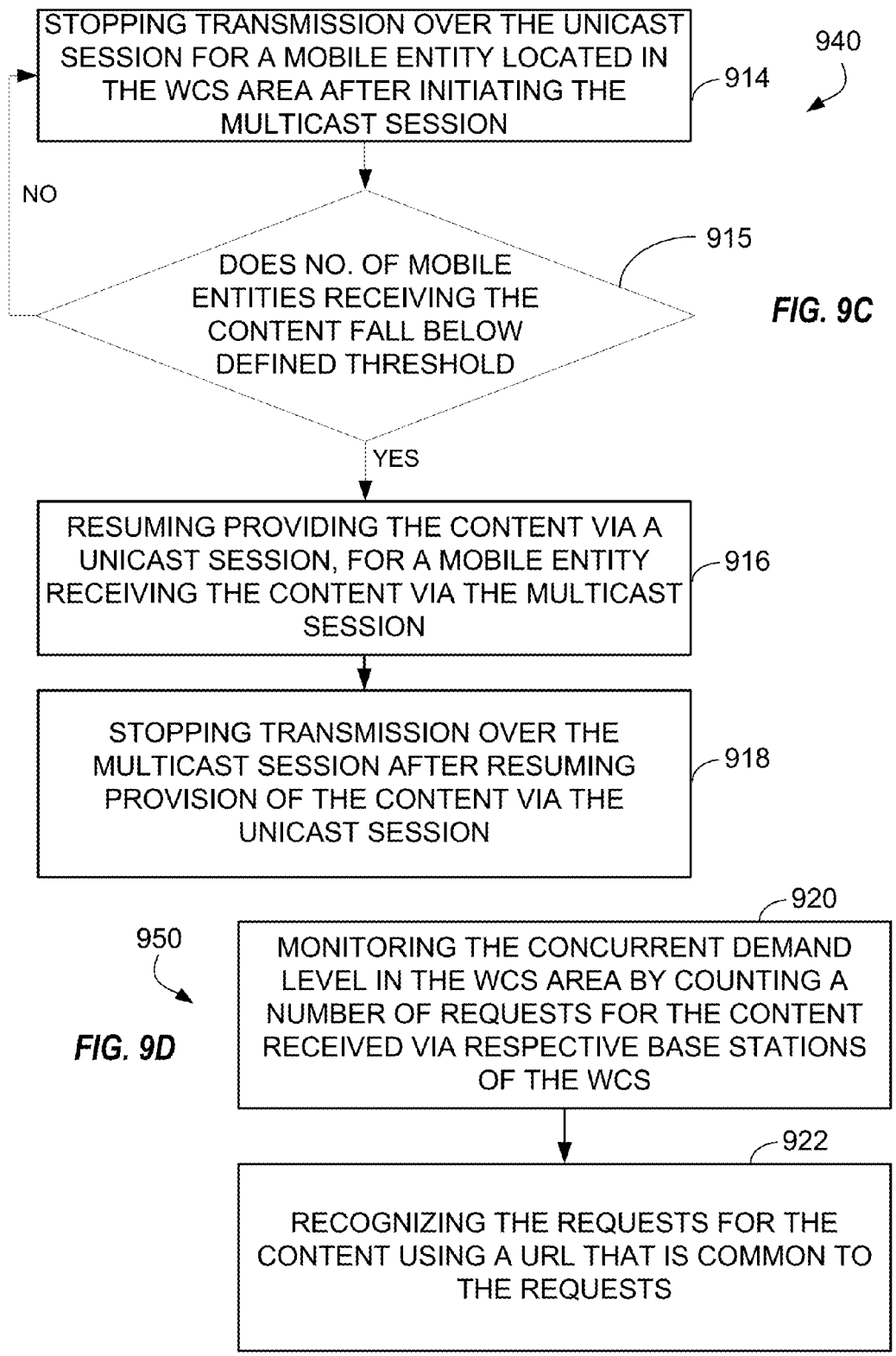

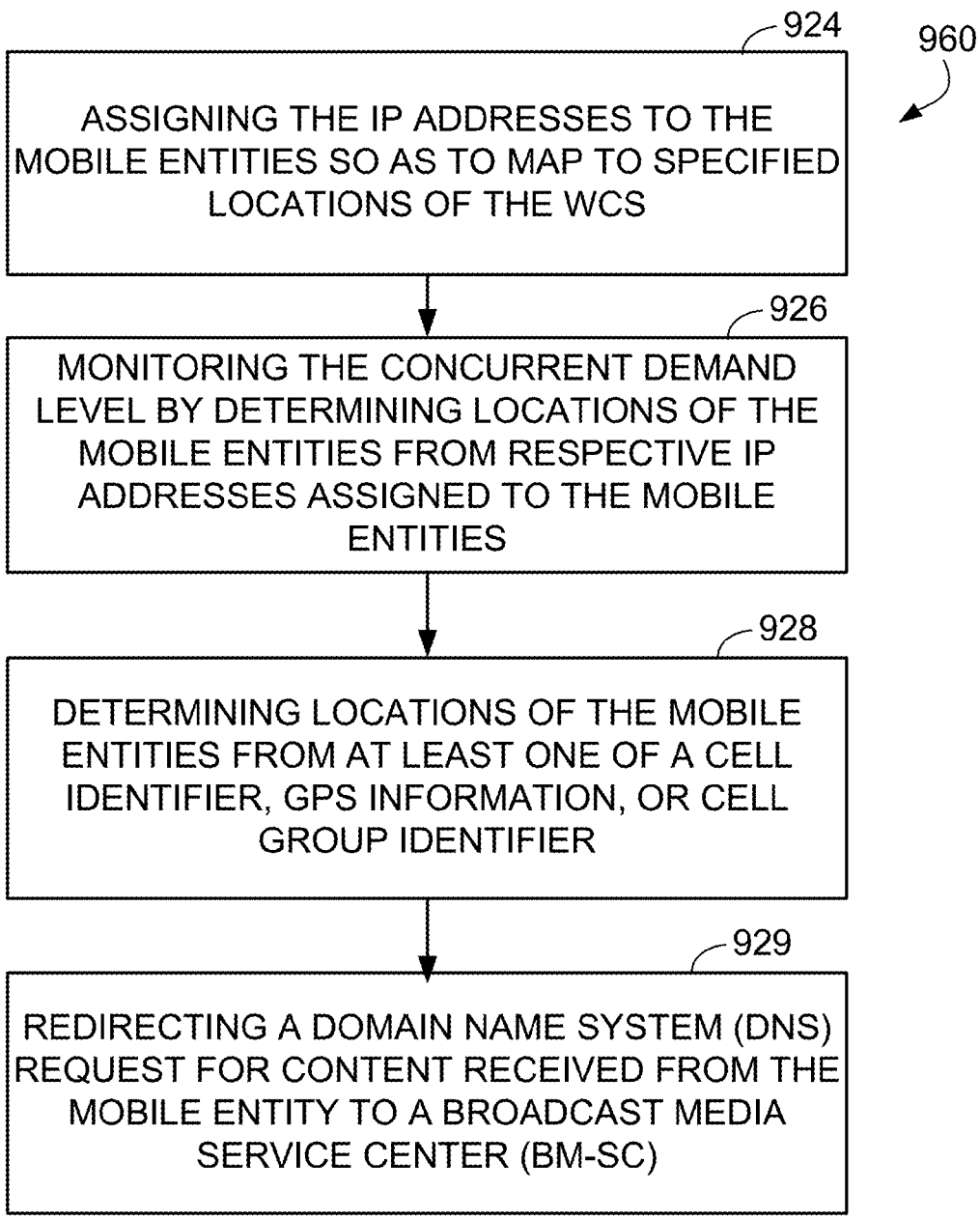

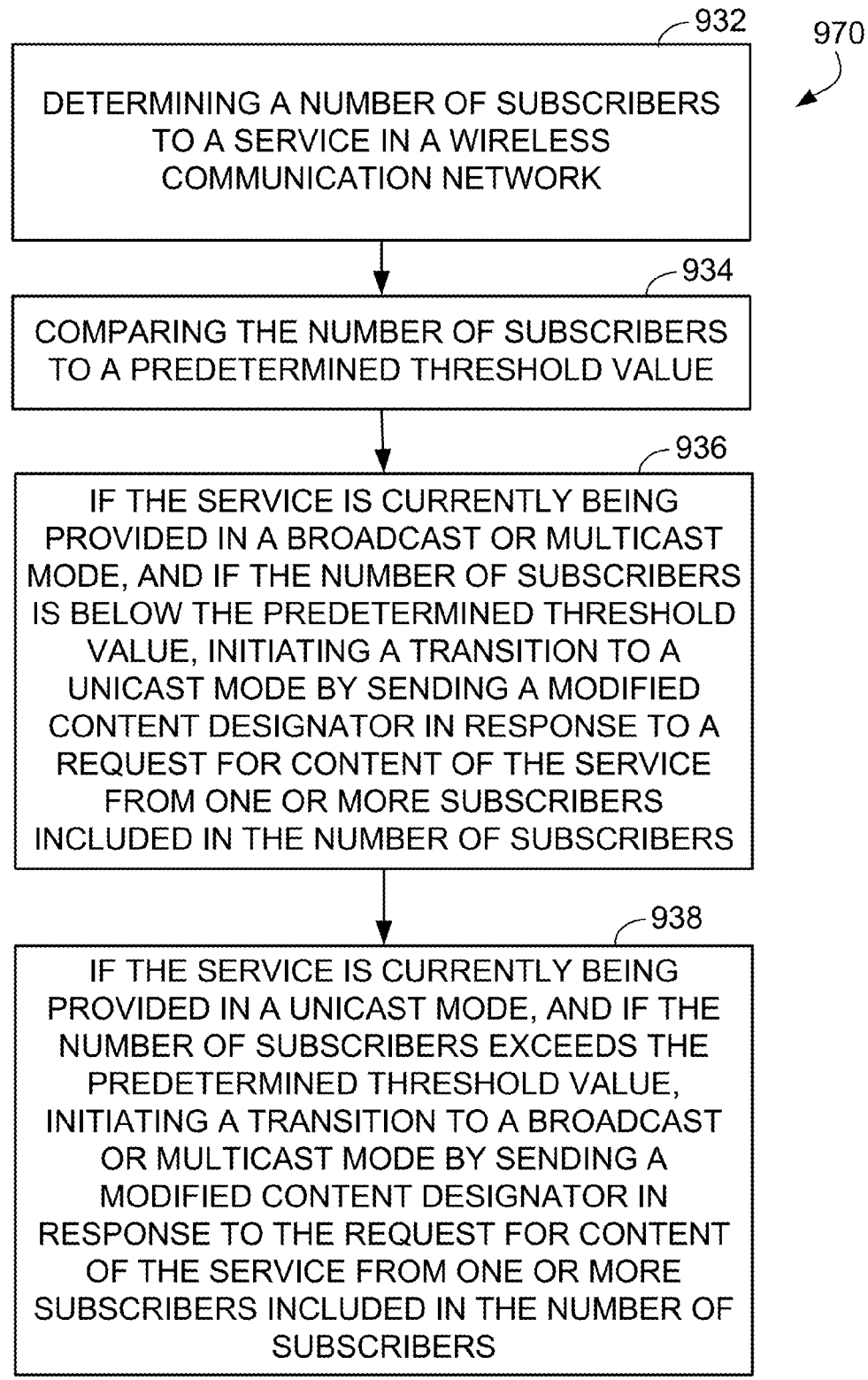

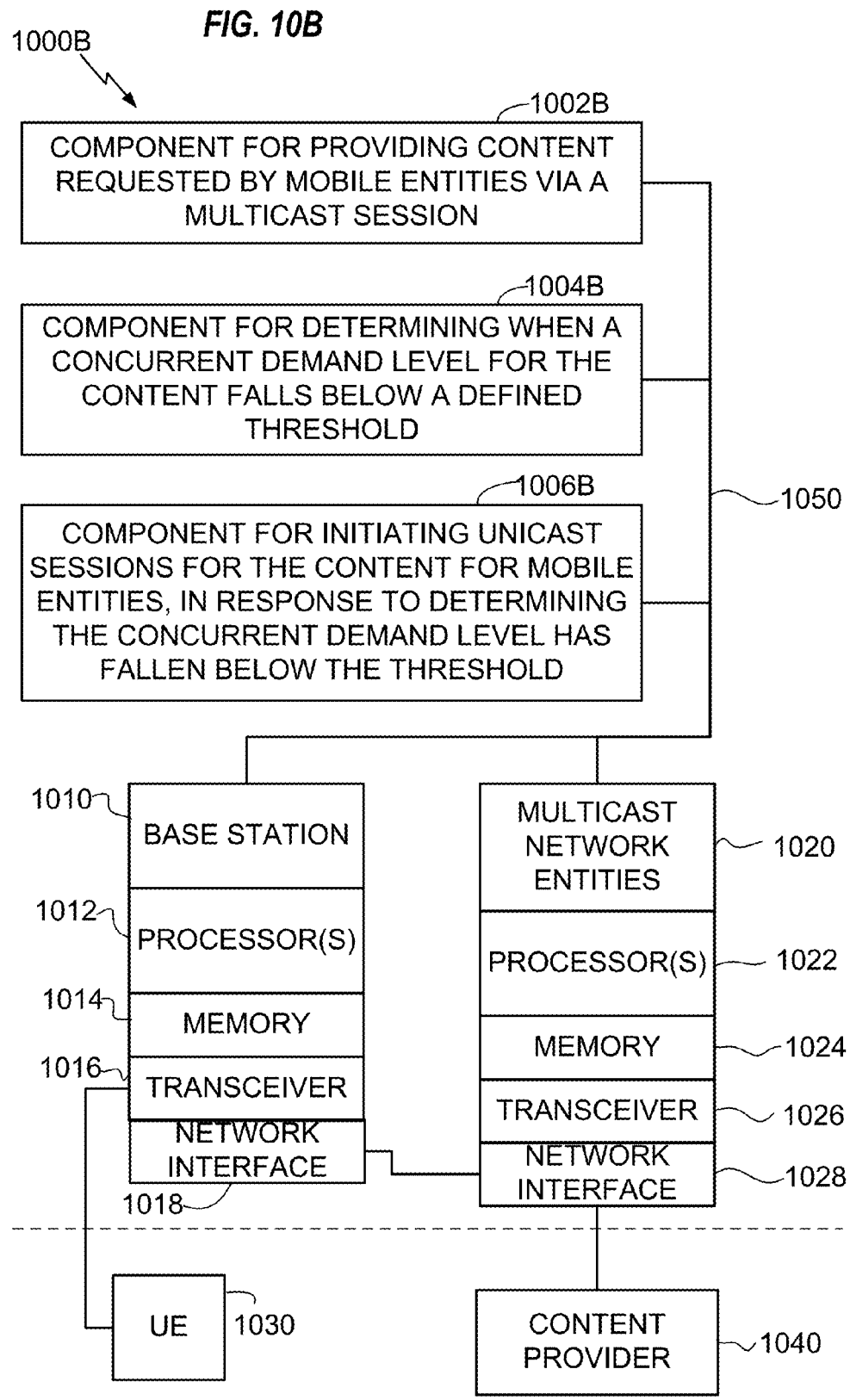

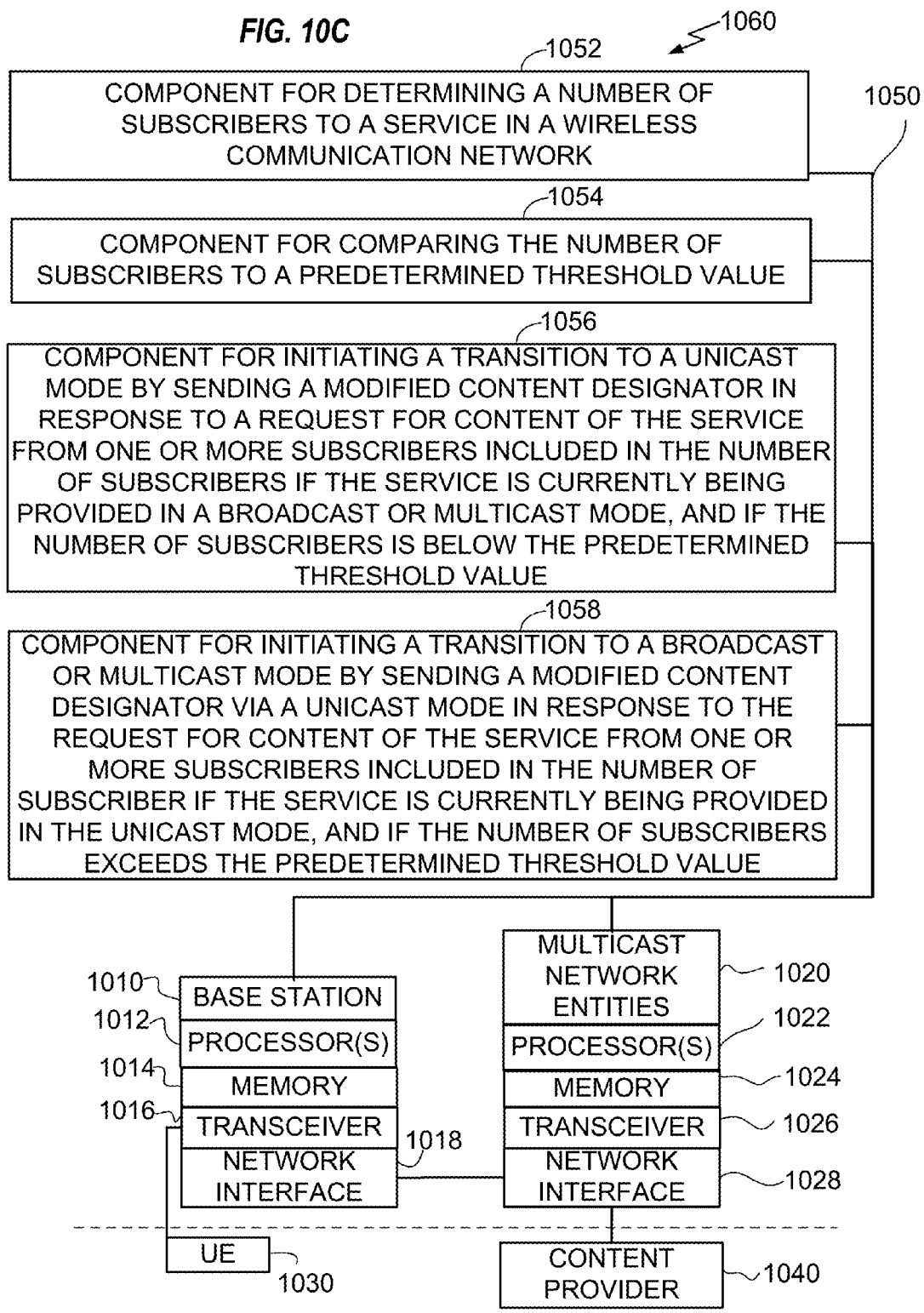

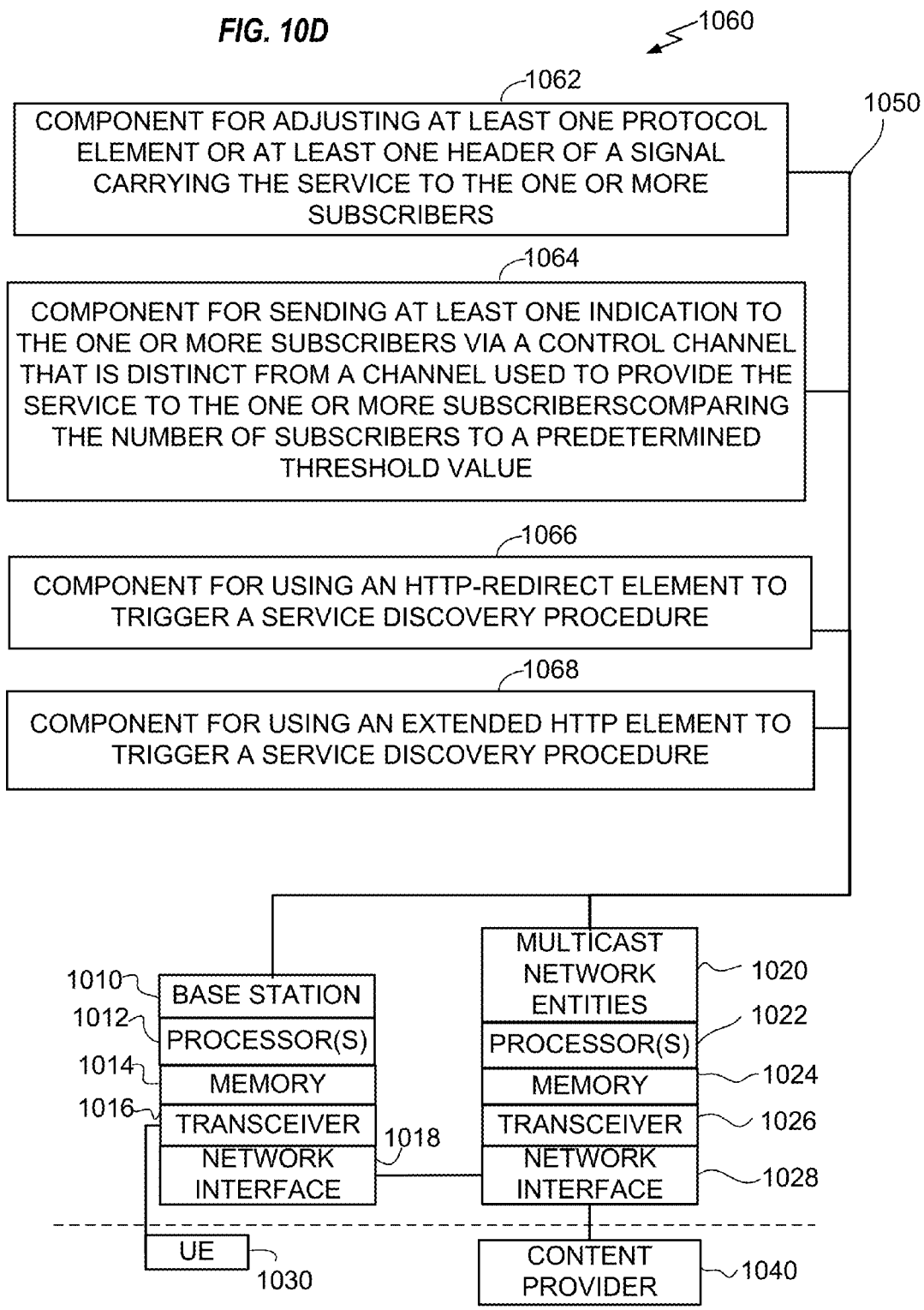

MANAGING HANDOFF TRIGGERING BETWEEN UNICAST AND MULTICAST SERVICES

CROSS-REFERENCE TO RELATED APPLICATION

The present application for patent claims priority to Provisional Application No. 61/511,490, filed Jul. 25, 2011, entitled "MANAGING HANDOFF TRIGGERING BETWEEN UNICAST AND MULTICAST SERVICES", which is assigned to the assignee hereof, and is hereby expressly incorporated in its entirety by reference herein.

FIELD

Aspects of the present disclosure may relate generally to wireless communication systems, and may relate more particularly, to managing provision of multimedia services in a wireless communications network.

BACKGROUND

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs), also referred to as mobile devices or mobile entities. A UE may communicate with a base station via a downlink and an uplink. The downlink (or forward link) refers to the communication link from the base station to the UE, and the uplink (or reverse link) refers to the communication link from the UE to the base station. As used herein, a "base station" means an evolved Node B (eNode B or eNB), a Node B, a Home Node B, or similar network component of a wireless communications system.

The 3rd Generation Partnership Project (3GPP) Long Term Evolution (LTE) represents a major advance in cellular technology as an evolution of Global System for Mobile communications (GSM) and Universal Mobile Telecommunications System (UMTS). The LTE physical layer (PHY) provides a highly efficient way to convey both data and control information between base stations, such as evolved Node Bs (eNBs), and mobile entities, such as UEs. In prior applications, a method for facilitating high bandwidth communication for multimedia has been single frequency network (SFN) operation. SFNs utilize radio transmitters, such as, for example, eNBs, to communicate with subscriber UEs. In unicast operation, each eNB may be controlled so as to transmit signals carrying information directed to one or more particular subscriber UEs. The specificity of unicast signaling may be used to enable person-to-person services such as, for example, voice calling, text messaging, or video calling.

In broadcast operation, one or several eNBs in a broadcast area may broadcast signals in a synchronized fashion, carrying information that can be received and accessed by any subscriber UE in the broadcast area. The generality of broadcast operation enables greater efficiency in transmitting information of general public interest, for example, event-related multimedia broadcasts. As the demand and system capability for event-related multimedia and other broadcast services has increased, system operators have shown increasing interest in making use of broadcast operation in 3GPP networks. In the past, 3GPP LTE technology has been primarily used for unicast service, leaving opportunities for improvements and enhancements related to broadcast signaling.

In the context, it would be desirable to maintain continuity of service with respect to content being delivered to a UE, when the UE switches its communication mode (e.g., from broadcast mode to unicast mode, or from unicast mode to broadcast mode). Stated differently, it would be desirable to avoid service interruption at the UE with respect to the content being delivered. For example, in a scenario where the UE switches from unicast mode to broadcast mode, the UE may be monitoring a different channel/frequency than the channel/frequency used to deliver the content and/or service announcement via the broadcast. As such, the UE monitoring the unicast traffic channel may not know that it should switch to the broadcast channel to avoid a service interruption. The UE may continue to receive content on the unicast channel until the broadcast channel is setup. In the example of a scenario where the UE switches from broadcast mode to unicast mode, it would be desirable for the UE to setup the unicast traffic channel before the broadcast is halted or shutdown. Here, the UE may not know that it should setup the unicast traffic channel to continue receiving content. Accordingly, there is a need for a technique for instructing or configuring a UE to monitor the appropriate channels/frequencies and/or setup the appropriate channels/frequencies to avoid interruption of the services to the UE.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Disclosed are methods and apparatus for managing handoff triggering between unicast and multicast services. According to one aspect, a method includes determining a number of subscribers to a service in a wireless communication network. The method further includes comparing the number of subscribers to a predetermined threshold value. The method further includes initiating a transition to a unicast mode by sending a modified content designator in response to a request for content of the service from one or more subscribers included in the number of subscribers if the service is currently being provided in a broadcast or multicast mode, and if the number of subscribers is below the predetermined threshold value. The method further includes initiating a transition to a broadcast or multicast mode by sending the modified content designator via a unicast mode in response to the request for content of the service from one or more subscribers included in the number of subscribers if the service is currently being provided in the unicast mode, and if the number of subscribers exceeds the predetermined threshold value.

According to another aspect, an apparatus in a wireless communication network includes one or more processors configured to determine a number of subscribers to a service in the wireless communication network; compare the number of subscribers to a predetermined threshold value; if the service is currently being provided in a broadcast or multicast mode, and if the number of subscribers is below the predetermined threshold value, initiate a transition to a unicast mode by sending a modified content designator in response to a request for content of the service from one or more subscribers included in the number of subscribers; and if the service is currently being provided in a unicast mode, and if the number of subscribers exceeds the predetermined threshold value, initiate a transition to a broadcast or multicast mode by sending the modified content designator via the unicast mode in response to the request for content of the service from one or more subscribers included in the number of subscribers. The apparatus further includes at least one memory configured to store data.

According to another aspect, an apparatus in a wireless communication network includes means for determining a number of subscribers to a service in the wireless communication network; means for comparing the number of subscribers to a predetermined threshold value; and transceiver means for: initiating a transition to a unicast mode by sending a modified content designator in response to a request for content of the service from one or more subscribers included in the number of subscribers if the service is currently being provided in a broadcast or multicast mode, and if the number of subscribers is below the predetermined threshold value; and initiating a transition to a broadcast or multicast mode by sending the modified content designator via a unicast mode in response to the request for content of the service from one or more subscribers included in the number of subscribers if the service is currently being provided in the unicast mode, and if the number of subscribers exceeds the predetermined threshold value.

According to another aspect, a computer program product including a computer-readable medium containing code that, upon execution by one or more processing devices, results in implementation of operations including: determining a number of subscribers to a service in a wireless communication network; comparing the number of subscribers to a predetermined threshold value; if the service is currently being provided in a broadcast or multicast mode, and if the number of subscribers is below the predetermined threshold value, initiating a transition to a unicast mode by sending a modified content designator in response to a request for content of the service from one or more subscribers included in the number of subscribers; and if the service is currently being provided in a unicast mode, and if the number of subscribers exceeds the predetermined threshold value, initiating a transition to a broadcast or multicast mode by sending the modified content designator via the unicast mode in response to the request for content of the service from one or more subscribers included in the number of subscribers.

Disclosed are methods and apparatus for transitioning between receiving content via multicast delivery of a service and unicast delivery of the service in a wireless communications system. According to one aspect, a method includes obtaining, at a terminal of a wireless communication network, a multimedia service in a wireless communication network, the multimedia service being provided in a first providing mode; receiving, by the terminal, a modified content designator from the communication network indicating that the service is to transition from the first providing mode to a second providing mode; and initiating, by the terminal, a transition from the first providing mode to the second providing mode, in response to the modified content designator.

According to another aspect, a terminal for use in a wireless communication network includes at least one processor configured to: obtain a multimedia service in a wireless communication network, the multimedia service being provided in a first providing mode; receive a modified content designator from the communication network indicating that the service is to transition from the first providing mode to a second providing mode; and initiate a transition from the first providing mode to the second providing mode, in response to the modified content designator. The terminal further includes at least one memory configured to store data.

According to another aspect, a terminal for use in a wireless communication network includes means for obtaining a multimedia service in a wireless communication network, the multimedia service being provided in a first providing mode; transceiver means for receiving a modified content designator from the communication network indicating that the service is to transition from the first providing mode to a second providing mode; and means for initiating a transition from the first providing mode to the second providing mode, in response to the modified content designator. The terminal further includes at least one memory configured to store data.

According to another aspect, a computer program product including a computer-readable medium containing code that, upon execution by one or more processing devices, results in implementation of operations including: obtaining, at a terminal of a wireless communication network, a multimedia service in a wireless communication network, the multimedia service being provided in a first providing mode; receiving, by the terminal, an modified content designator from the communication network indicating that the service is to transition from the first providing mode to a second providing mode; and initiating, by the terminal, a transition from the first providing mode to the second providing mode, in response to the modified content designator.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWINGS

FIG. 7 illustrates an embodiment of a methodology for managing a multicast service in a wireless communications system.

FIG. 8 is a state diagram illustrating active and inactive/standby states of a multicast session.

FIGS. 9A-G illustrate embodiments of methodologies for implementing a demand-based multicast service in a wireless communications system.

FIGS. 10A-D illustrate examples of systems for implementing the methodologies of FIGS. 9A-G.

DETAILED DESCRIPTION

The detailed description set forth below, in connection with the appended drawings, is intended as a description of various configurations/embodiments and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
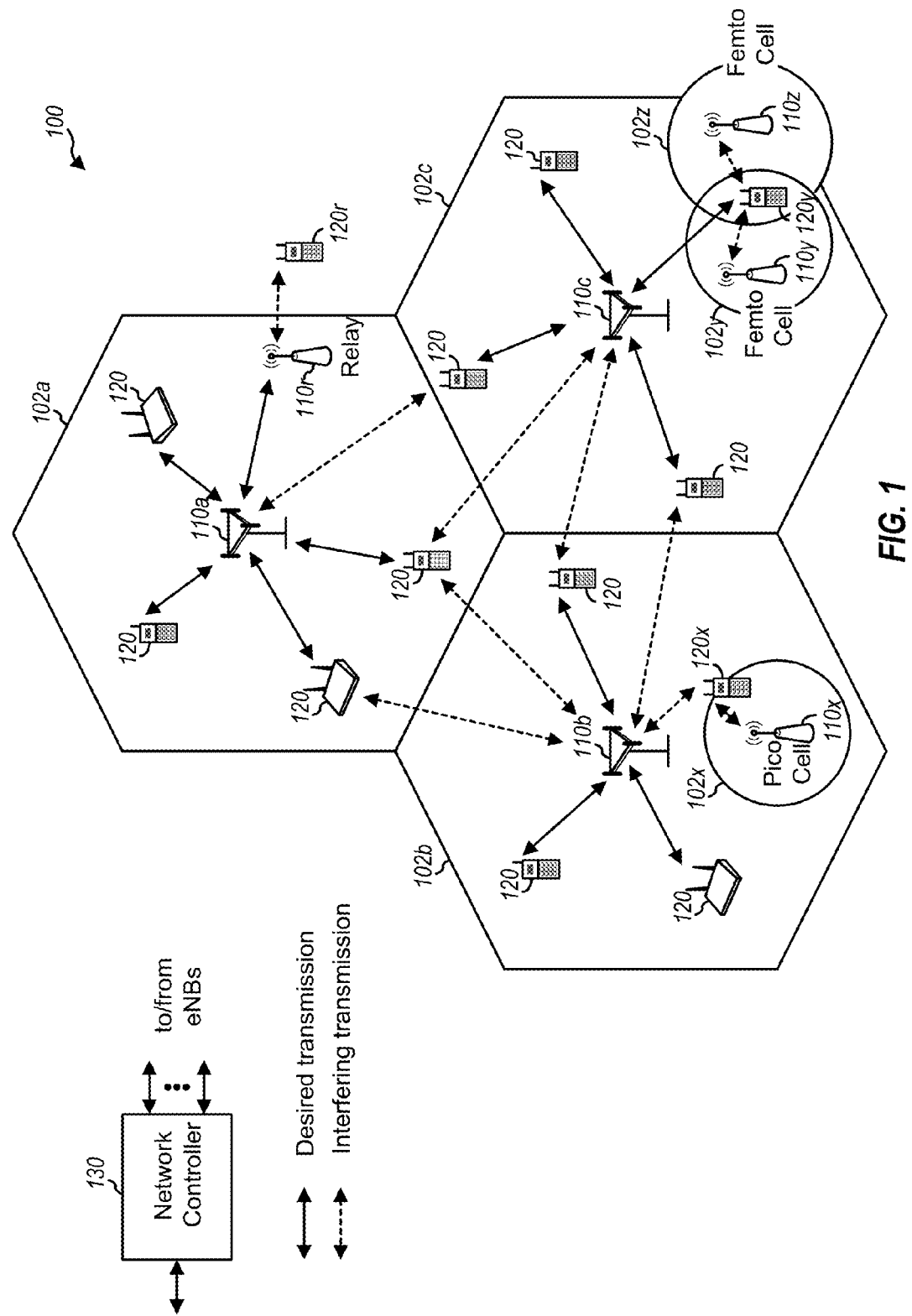
FIG. 1 is a block diagram conceptually illustrating an example of a telecommunications system.

FIG. 1 shows a wireless communication network 100, which may be an LTE network. The wireless network 100 may include a number of eNBs 110 and other network entities. An eNB may be a station that communicates with the UEs and may also be referred to as a base station, a Node B, an access point, or other term. Each eNB 110a, 110b, 110c may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB (HNB). In the example shown in FIG. 1, the eNBs 110a, 110b and 110c may be macro eNBs for the macro cells 102a, 102b and 102c, respectively. The eNB 110x may be a pico eNB for a pico cell 102x, serving a UE 120x. The eNBs 110y and 110z may be femto eNBs for the femto cells 102y and 102z, respectively. An eNB may support one or multiple (e.g., three) cells.

The wireless network 100 may also include relay stations 110r. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, etc.

The wireless network 100 may be a heterogeneous network that may include eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 5 to 40 Watts), whereas pico eNBs, femto eNBs and relays may have a lower transmit power level (e.g., 0.1 to 2 Watts).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a smart phone, a personal digital assistant (PDA), a wireless modem, a wireless communication device, a handheld device, a laptop computer, a cordless phone, a wireless local loop (WLL) station, or other mobile entities. A UE may be able to communicate with macro eNBs, pico eNBs, femto eNBs, relays, or other network entities. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE may utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols may be sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
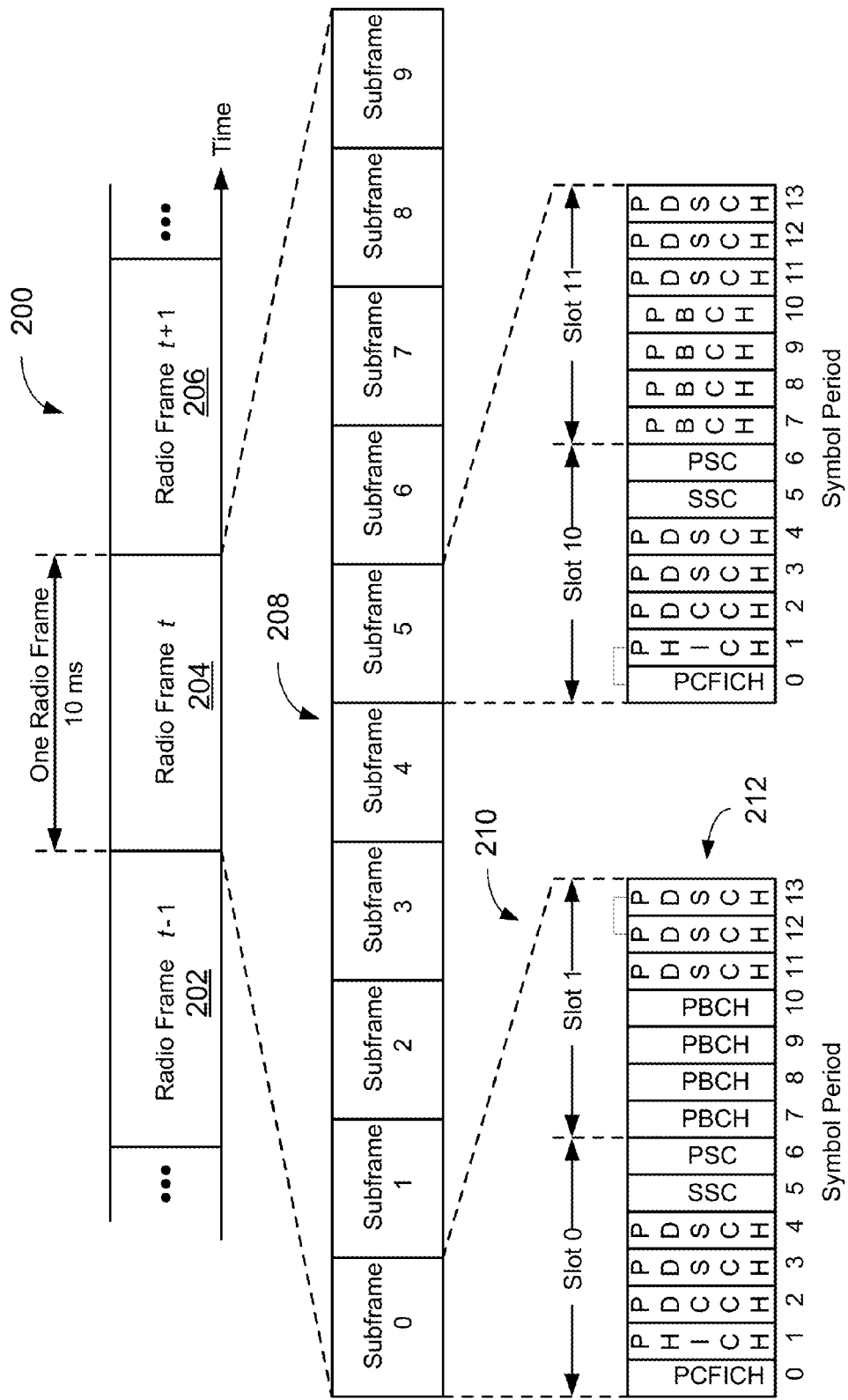
FIG. 2 is a block diagram conceptually illustrating an example of a down link frame structure in a telecommunications system.
Figure 6:
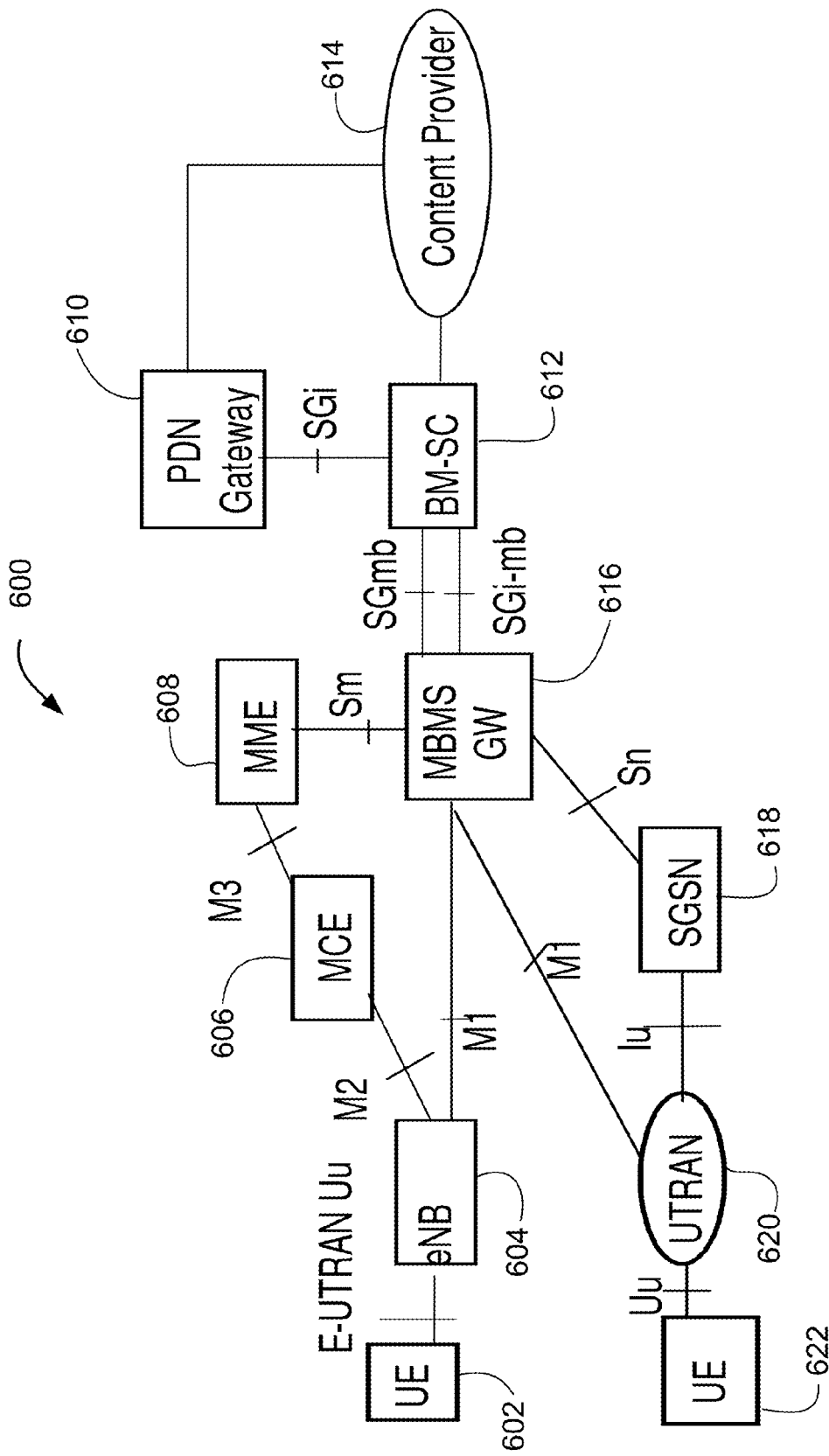
FIG. 6 is a block diagram illustrating components of a wireless communication system for providing or supporting MBSFN service.

FIG. 2 shows a downlink frame structure 200 used in LTE. The transmission timeline for the downlink may be partitioned into units of radio frames 202, 204, 206. Each radio frame may have a predetermined duration (e.g., 10 milliseconds (ms)) and may be partitioned into 10 subframes 208 with indices of 0 through 9. Each subframe may include two slots, e.g., slots 210. Each radio frame may thus include 20 slots with indices of 0 through 19. Each slot may include L symbol periods, e.g., 7 symbol periods 212 for a normal cyclic prefix (CP), as shown in FIG. 2, or 6 symbol periods for an extended cyclic prefix. The normal CP and extended CP may be referred to herein as different CP types. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on resource allocation for UEs and control information for downlink channels. Although not shown in the first symbol period in FIG. 2, it is understood that the PDCCH and PHICH may also be included in the first symbol period. Similarly, the PHICH and PDCCH may also both be in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
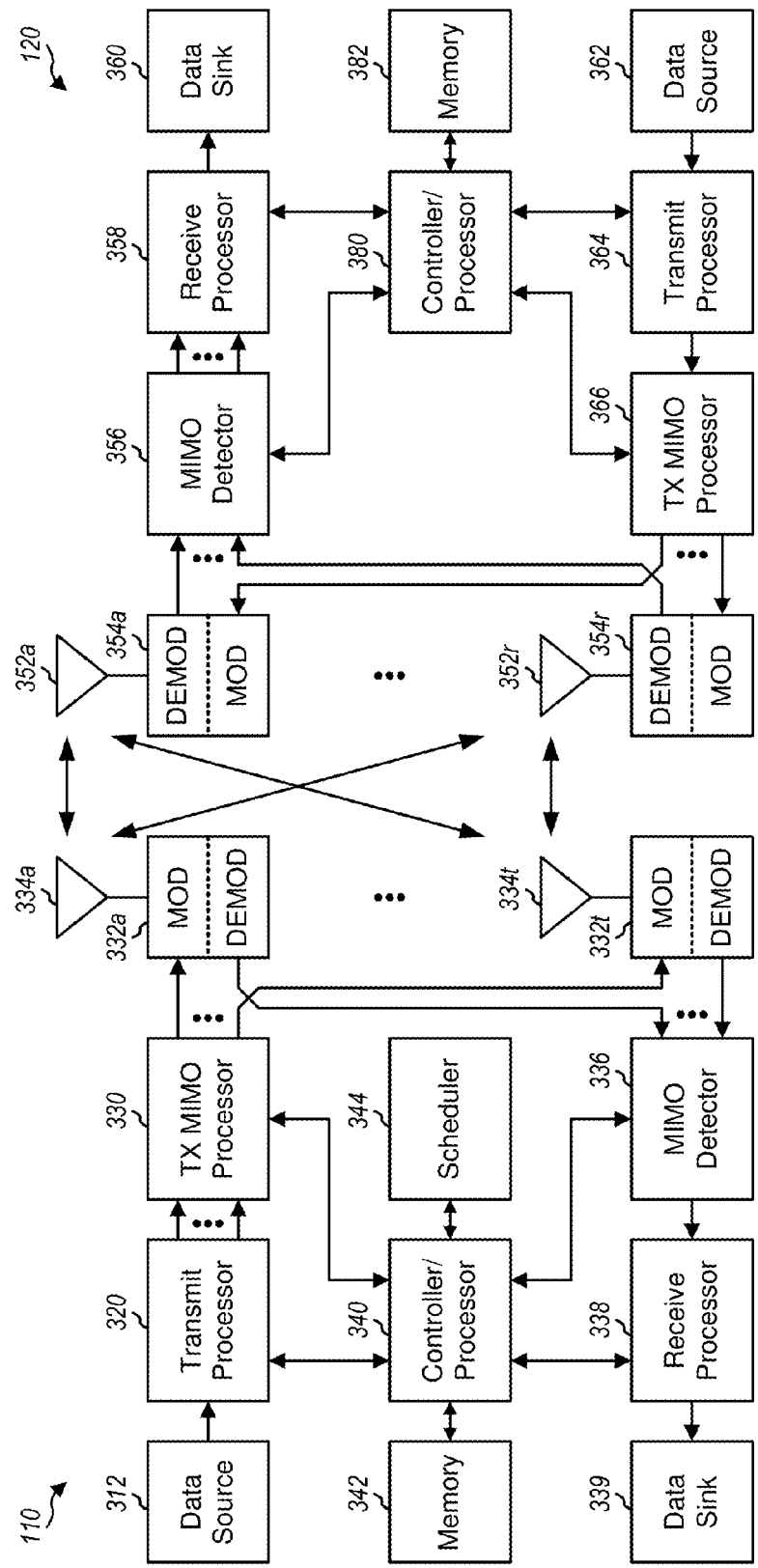
FIG. 3 is a block diagram conceptually illustrating a design of a base station/eNB and a UE configured according to one aspect of the present disclosure.

FIG. 3 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in FIGS. 4 and 5, and/or other processes for the techniques described herein. The memories 342 and 382 may store data and program codes for the base station 110 and the UE 120, respectively. A scheduler 344 may schedule UEs for data transmission on the downlink and/or uplink.

eMBMS and Unicast Signaling in Single Frequency Networks

One mechanism to facilitate high bandwidth communication for multimedia has been single frequency network (SFN) operation. Particularly, Multimedia Broadcast Multicast Service (MBMS) and MBMS for LTE, also known as evolved MBMS (eMBMS) (including, for example, what has recently come to be known as multimedia broadcast single frequency network (MBSFN) in the LTE context), can utilize such SFN operation. SFNs may utilize radio transmitters, such as, for example, eNBs, to communicate with subscriber UEs. Groups of eNBs may transmit information in a synchronized manner, so that signals reinforce one another rather than interfere with each other. In the context of eMBMS, the shared content may be transmitted from multiple eNBs of a LTE network to multiple UEs. Therefore, within a given eMBMS area, a UE may receive eMBMS signals from any eNB (or eNBs) within radio range and part of the MBSFN area. However, to decode the eMBMS signal each UE may receive Multicast Control Channel (MCCH) information from a serving eNB over a non-eMBMS channel. MCCH information may change from time to time, and notification of changes may be provided through another non-eMBMS channel, the PDCCH. Therefore, to decode eMBMS signals within a particular eMBMS area, each UE may be served MCCH and PDCCH signals by (at least) one of the eNBs in the area.

With respect a physical layer (PHY) of eMBMS for LTE Frequency Division Duplex (FDD), the channel structure may comprise time division multiplexing (TDM) resource partitioning between an eMBMS and unicast transmissions on mixed carriers, thereby allowing flexible and dynamic spectrum utilization. Currently, a subset of subframes (which may, for example, be up to 60%), known as multimedia broadcast single frequency network (MBSFN) subframes, can be reserved for eMBMS transmission. As such, current eMBMS design allows at most six out of ten subframes for eMBMS; however, the disclosure is not thus limited.

Figure 4:
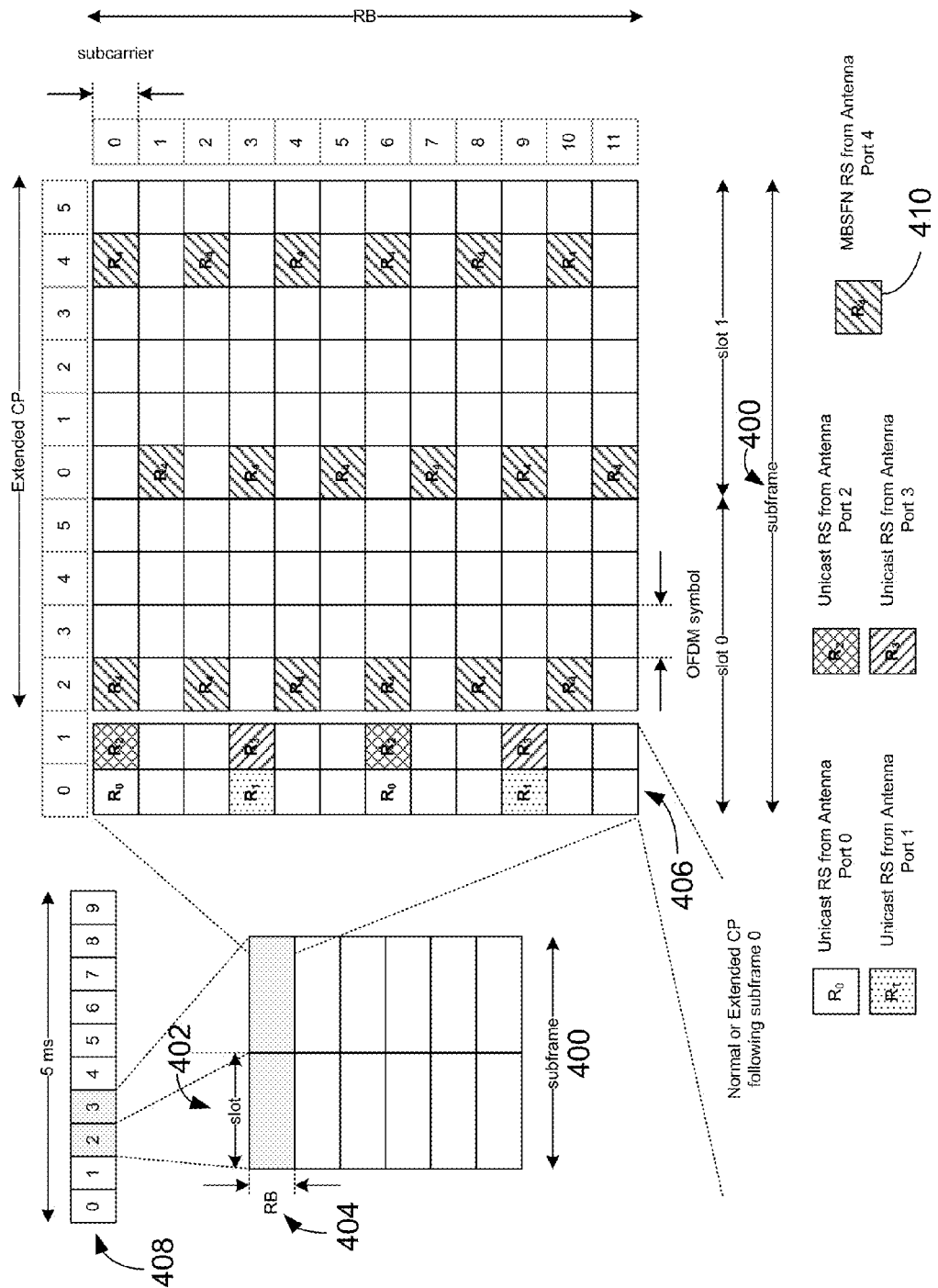
FIG. 4 is a diagram of a signaling frame illustrating an example of symbol allocation for unicast and multicast signals.

An example of subframe allocation for eMBMS, to which the disclosure is not limited, is shown in FIG. 4, which shows an existing allocation of MBSFN reference signals on MBSFN subframes 400, for a single-carrier case. Components depicted in FIG. 4 correspond to those shown in FIG. 2, with FIG. 4 showing the individual subcarriers within each slot 402 and resource block (RB) 404. In 3GPP LTE, an RB 404 may span 12 subcarriers over a slot duration of 0.5 ms, and each subcarrier may have a bandwidth of 15 kHz together spanning 180 kHz per RB. Subframes may be allocated for unicast or eMBMS; for example, in a sequence 408 of subframes labeled 0, 1, 2, 3, 4, 5, 6, 7, 8, and 9, subframes 0, 4, 5, and 9 may be excluded from eMBMS in FDD. Also, subframes 0, 1, 5, and 6 may be excluded from eMBMS in time division duplex (TDD). More specifically, subframes 0, 4, 5, and 9 may be used for PSS/SSS/PBCH/paging/system information blocks (SIBs) and unicast service. Remaining subframes in the sequence, e.g., subframes 1, 2, 3, 6, 7, and 8 may be configured as eMBMS subframes.

With continued reference to FIG. 4, within each eMBMS subframe 400, the first 1 or 2 symbols 406 may be used for unicast reference symbols (RSs) and control signaling. A CP length of the first 1 or 2 symbols 406 may follow that of subframe 0. A transmission gap may occur between the first 1 or 2 symbols 406 and the eMBMS symbols if the CP lengths are different. In related aspects, the overall eMBMS bandwidth utilization may be 42.5% considering RS overhead (e.g., 6 eMBMS subframes and 2 control symbols within each eMBMS subframe). Techniques for providing MBSFN RSs and unicast RSs may typically involve allocating the MBSFN RSs on MBSFN subframes (as shown in FIG. 4), and may also involve separately allocating unicast RSs on non-MBSFN subframes. More specifically, as FIG. 4 shows, the extended CP of the MBSFN subframe 400 may include MBSFN RSs 410 but not unicast RSs. The present technology is not limited to the particular frame allocation scheme illustrated by FIGS. 2 and 4, which are presented by way of example, and not by way of limitation. A multicast session or multicast broadcast as used herein may use any suitable frame allocation scheme.

eMBMS Service Areas

Figure 5:
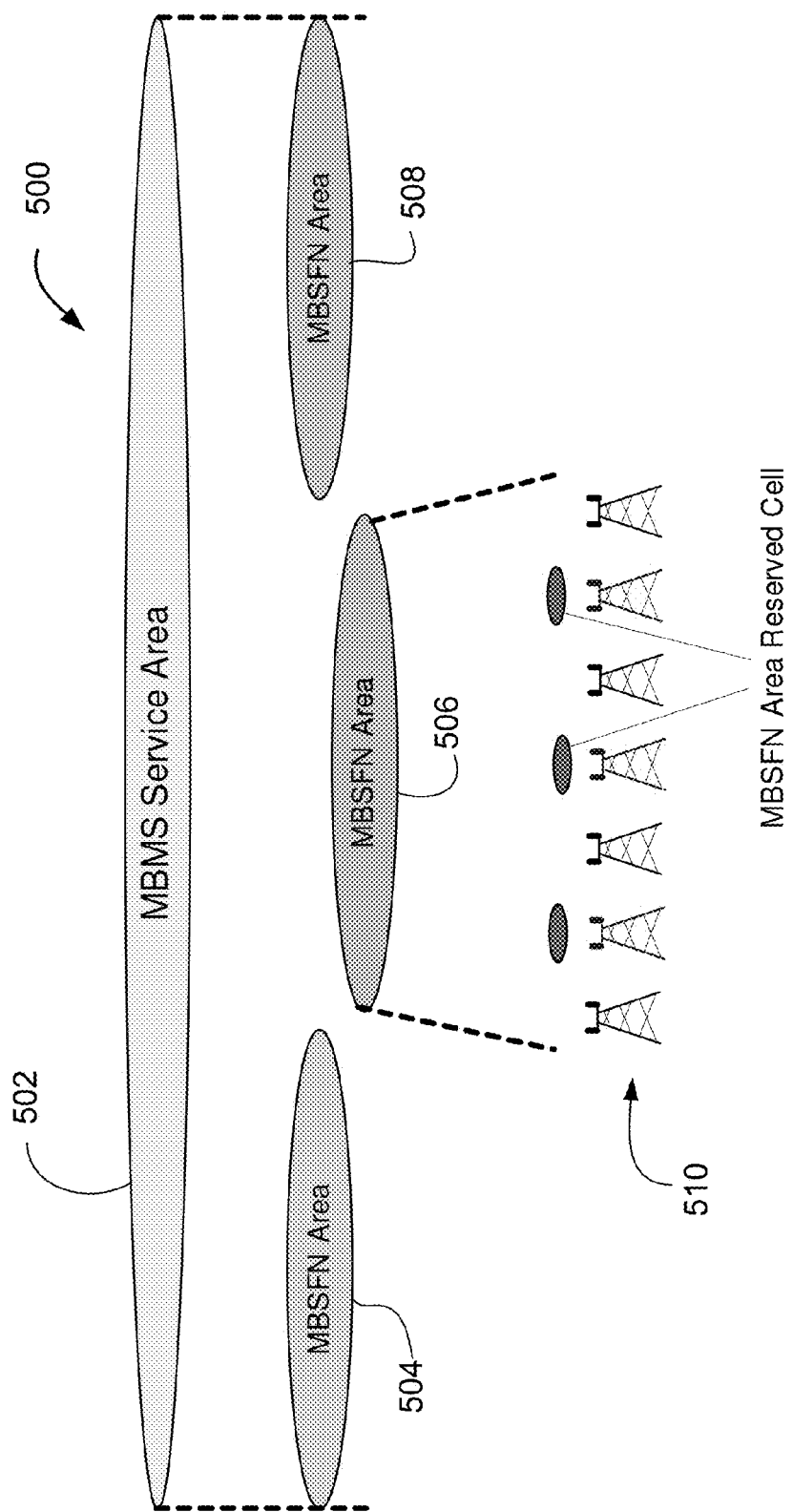
FIG. 5 is a diagram illustrating MBMS over a Single Frequency Network (MBSFN) areas within an MBSFN service area.

FIG. 5 illustrates an exemplary system 500, to which the disclosure is not limited, including an MBMS service area 502 encompassing multiple MBSFN areas 504, 506, 508, which themselves may include multiple cells or base stations 510. As used herein, an "MBMS service area" refers to a group of wireless transmission cells where a certain MBMS service is available. For example, a particular sports or other program may be broadcast by base stations within the MBMS service area at a particular time. The area where the particular program is broadcast defines the MBMS service area. The MBMS service area may be made up of one or more "MBSFN areas" as shown at 504, 506 and 508. As used herein, an MBSFN area refers to a group of cells (e.g., cells 510) currently broadcasting a particular program in a synchronized manner using an MBSFN protocol. An "MBSFN synchronization area" refers to a group of cells that are interconnected and configured in a way such that they are capable of operating in a synchronized manner to broadcast a particular program using an MBSFN protocol, regardless of whether or not they are currently doing so. Each eNB can belong to only one MBSFN synchronization area, on a given frequency layer. It is worth noting that an MBMS service area 502 may include one or more MBSFN synchronization areas (not shown). Conversely, an MBSFN synchronization area may include one or more MBSFN areas or MBMS service areas. Generally, an MBSFN area may be made up of all, or a portion of, a single MBSFN synchronization area and may be located within a single MBMS service area. Overlap between various MBSFN areas may be supported, and a single eNB may belong to several different MBSFN areas. For example, up to 8 independent MCCHs may be configured in System Information Block (SIB) 13 to support membership in different MBSFN areas. An MBSFN Area Reserved Cell or Base Station is a cell/base station within a MBSFN Area that does not contribute to the MBSFN transmission, for example, a cell near a MBSFN Synchronization Area boundary, or a cell that that is not needed for MBSFN transmission because of its location.

eMBMS System Components and Functions

FIG. 6 illustrates functional entities of a wireless communication system 600 for providing or supporting MBSFN service. Regarding Quality of Service (QoS), the system 600 may use a Guaranteed Bit Rate (GBR) type MBMS bearer, wherein the Maximum Bit Rate (MBR) equals the GBR. These components are shown and described by way of example, and do not limit the inventive concepts described herein, which may be adapted to other architectures and functional distributions for delivering and controlling multicast transmissions.

The system 600 may include an MBMS Gateway (MBMS GW) 616. The MBMS GW 616 may control Internet Protocol (IP) multicast distribution of MBMS user plane data to eNodeBs 604 via an M1 interface; one eNB 604 of many possible eNBs is shown. In addition, the MBMS GW may control IP multicast distribution of MBMS user plane data to UTRAN Radio Network Controllers (RNCs) 620 via an M1 interface; one UTRAN RNC 620 of many possible RNCs is shown. The M1 interface may be associated to MBMS data (user plane) and may make use of IP for delivery of data packets. The eNB 604 may provide MBMS content to a UE/mobile entity 602 via an E-UTRAN Uu interface. The RNC 620 may provide MBMS content to a UE/mobile entity 622 via a Uu interface. The MBMS GW 616 may further perform MBMS Session Control Signaling, for example, MBMS session start and session stop, via the Mobility Management Entity (MME) 608 and Sm interface. The MBMS GW 616 may further provide an interface for entities using MBMS bearers through the SG-mb (user plane) reference point, and may provide an interface for entities using MBMS bearers through the SGi-mb (control plane) reference point. The SG-mb Interface may carry MBMS bearer service specific signaling. The SGi-mb interface is a user plane interface for MBMS data delivery. MBMS data delivery may be performed by IP unicast transmission, which may be a default mode, or by IP multicasting. The MBMS GW 616 may provide a control plane function for MBMS over UTRAN via a Serving General Packet Radio Service Support Node (SGSN) 618 and the Sn/Iu interfaces.

The system 600 may further include a Multicast Coordinating Entity (MCE) 606. The MCE 606 may perform an admission control function for MBMS content, and may allocate time and frequency radio resources that may be used by all eNBs in the MBSFN area for multi-cell MBMS transmissions using MBSFN operation. The MCE 606 may determine a radio configuration for an MBSFN Area, such as, for example, the modulation and coding scheme. The MCE 606 may schedule and control user plane transmission of the MBMS content, and may manage eMBMS service multiplexing, e.g., by determining which services are to be multiplexed in which Multicast Channel (MCH). The MCE 606 may participate in MBMS Session Control Signaling with the MME 608 through an M3 interface, and may provide a control plane interface M2 with the eNB 604.

The system 600 may further include a Broadcast-Multicast Service Center (BM-SC) 612 that may be in communication with a content provider server 614. The BM-SC 612 may handle intake of multicast content from one or more sources, such as the content provider server 614, and may provide other higher-level management functions. These functions may include, for example, a membership function, which may include authorization and initiation of MBMS services for an identified UE. The BM-SC 612 may further perform MBMS session and transmission functions, scheduling of live broadcasts, and/or delivery, including MBMS and associated delivery functions. The BM-SC 612 may further provide service advertisement and description, such as advertising content available for multicast. A separate Packet Data Protocol (PDP) context may be used to carry control messages between UE and BM-SC. The BM-SC may further provide security functions such as key management, may manage charging of content providers according to parameters such as data volume and QoS, may provide content synchronization for MBMS in UTRAN and in E-UTRAN for broadcast mode, and may provide header compression for MBSFN data in UTRAN. The BM-SC 612 may indicate session start, update and stop to the MBMS-GW 616, including session attributes such as QoS and MBMS service area.

The system 600 may further include a Mobility Management Entity (MME) 608, which may be in communication with the MCE 606 and MBMS-GW 616. The MME 608 may provide a control plane function for MBMS over E-UTRAN. In addition, the MME may provide the eNB 604 and UE 602 with multicast related information defined by the MBMS-GW 616. An Sm interface between the MME 608 and the MBMS-GW 616 may be used to carry MBMS control signaling, for example, session start and stop signals.

The system 600 may further include a Packet Data Network (PDN) Gateway (GW) 610, sometimes abbreviated as a P-GW. The P-GW 610 may provide an Evolved Packet System (EPS) bearer between the UE 602 and BM-SC 612 for signaling and/or user data. As such, the P-GW may receive Uniform Resource Locator (URL) based requests originating from UEs in association with IP addresses assigned to the UEs. The BM-SC 612 may also be linked to one or more content providers via the P-GW 610, which may communicate with the BM-SC 612 via an IP interface, e.g., via the SGi interface, as shown in FIG. 6.

The system 600 may be used to transmit an eMBMS or other multicast session in an MBMS area. As shown in FIG. 7, a method 700 for handling an MBMS session may include an initial operation 702 of announcing or advertising availability of a scheduled transmission. The announcement or advertisement may be provided by the BM-SC. For example, an MBMS broadcast of a sporting event may be advertised in a specified area to begin at a certain date and time, for further example by using an Open Mobile Alliance (OMA) Mobile Broadcast Services Enabler Suite (B CAST) service guide. To obtain advertising, users, through the UE, may subscribe to a message service, download a program guide or listing, or take some other action. In the alternative, advertising may be pushed to mobile entities without requiring any action from the user. A service announcement may include, for example, a service identifier, service area identifier, schedule, applicable IP multicast address(es), and/or other information.

At 704, the system may initiate a multicast transmission at the advertised date and time, within the specified broadcast area. For example, the BM-SC may initiate an MBMS broadcast using a session start procedure to establish an MBMS radio bearer.

At 706, the system may provide a notification of ongoing or forthcoming MBMS services to a mobile entity, such as, for example, by using an MCCH change notification transmitted to the mobile entity. At 708, the system may transfer MBMS content for the advertised service to the mobile entity, using the established MBMS radio bearer (or MBMS bearer). At 710, once the eMBMS broadcast is completed, the system may stop the multicast session and releases its associated radio bearer.

An MBMS bearer context may be created in the MME, MBMS GW, SGN and other elements of a Radio Access Network (RAN) upon initiation of an MBMS session. FIG. 8 illustrates an exemplary state cycle 800 between an active session state 820 and an inactive/standby state 810 of an MBMS bearer context. The MBMS bearer context itself may include an MBMS GW Tunnel Endpoint ID for Control plane (TEID-C) and a Temporary Mobile Group Identity (TMGI). A unique TMGI per MBMS bearer service may be allocated by the BM-SC, and used for MBMS notification purpose. The MBMS bearer contest may further include a Flow Identifier; an MBMS GW IP Address for Control Plane in use; an MBMS GW IP Address for User Plane in use; and a Common Tunnel Endpoint ID (C-TEID) of the MBMS GW for the user plane. The MBMS bearer context may further include one or more QoS indicators or parameters, for example, a QoS Class Identifier (QCI), or MBR=GBR as mentioned above. The MBMS bearer context may further include an MBMS Service Area identifier; a list of downstream nodes; and an IP multicast and Source address for distribution, which may be selected by the MBMS GW. The foregoing MBMS bearer context components are provided by way of example only, and the present technology is not limited to a particular configuration of the MBMS bearer context.

A System-Level View of Demand-Based MBMS Management

In LTE, eMBMS applications may be classified as schedule-based eMBMS or demand-based eMBMS. In a schedule-based eMBMS application, a system operator on the network side may control transmission of eMBMS content, which occurs at a scheduled time. A mobile entity may be used to subscribe to the scheduled transmission and thereby receive content of interest to the mobile user. The eMBMS content offerings in this scheme may thus be limited to the operator's scheduled eMBMS transmissions.

In a demand-based eMBMS application, eMBMS content offerings may be provided in response to demand monitoring. For example, users may search and request content available over a wide-area network, such as the Internet. The system may monitor demand levels for specific content, and may detect demand that exceeds a first specified threshold. Similarly, the system may detect demand that falls below a second specified threshold, which may or may not be identical to the first specified threshold. These thresholds may float in response to current load levels or other parameters. In response to detecting demand in excess of the first specified threshold, the system may provide the demanded content via an eMBMS session and, as necessary, transition mobile entities from separately controlled unicast sessions to a common eMBMS broadcast for the contact within a specified network area, e.g., an MBMS area. Similarly, in response to detecting that demand is less than the second specified threshold, the system may provide the demanded content via separately controlled unicast sessions and, as necessary, may transition mobile entities from a common eMBMS broadcast to such unicast sessions. Consequently, MBMS content need not necessarily be limited to predetermined content selections broadcast by system operators on a scheduled basis. Users may, therefore, have access to a much broader array of content via eMBMS broadcasts. At the same time, system operators may obtain the advantage of more efficiently utilizing system resources by transmitting the most popular content in an area via multicast or via unicast, based on user demand.

Demand-based eMBMS may be further classified into two different types: live broadcasting and on-demand streaming or file downloading. Streaming of television-like programming using IP (IP TV) and IP radio are examples of live broadcasting types of demand based eMBMS. A characteristic of live broadcasting is that the source streams identical content to one or more destination addresses at substantially the same time, regardless of when a user initiates a streaming download, thereby emulating a broadcast of identical content to different receivers at the same time. Mobile entities receiving or requesting to receive particular live broadcast content may, using a demand-based methodology, be aggregated to receive the live content via multicast when located in the same MBSFN service area.

In comparison, a second type—on-demand streaming or file downloading—may be characterized by the content being provided to different destinations at different times selected by a user. The release of popular content may trigger concurrent or substantially concurrent streaming or downloading to different addresses. For example, the popularization of a video, or the release of a popularly anticipated application or application update, may cause many users to stream or download the content within a relatively narrow time window. Mobile entities receiving or requesting identical content within a shared time window, for example, within concurrent or overlapping downloading or streaming sessions, may partially or completely share bandwidth needed for the downloading or streaming using a demand-based eMBMS session.

Certain common issues may arise in providing demand-based eMBMS service, which may be resolved using different technological solutions. These issues may include, for example, demand monitoring and/or switching between unicast and multicast sessions when initiating or terminating a demand-based eMBMS session; such switching may be based on demand monitoring. Before discussing possible ways to address such issues in detail, an overview of a demand-based eMBMS method and system are discussed at a system level.

Example Methodologies and Apparatus

Methodologies that may be implemented in accordance with the disclosed subject matter may be better appreciated with reference to various flow charts. For purposes of simplicity of explanation, methodologies are shown and described as a series of acts/operations. However, the claimed subject matter is not limited by the number or order of operations, as some operations may occur in different orders and/or at substantially the same time with other operations from what is depicted and described herein. Moreover, not all illustrated operations may be required to implement methodologies described herein. It is to be appreciated that functionality associated with operations may be implemented by software, hardware, a combination thereof or any other suitable means (e.g., device, system, process, or component). Additionally, it should be further appreciated that methodologies disclosed throughout this specification are capable of being stored as encoded instructions and/or data on an article of manufacture to facilitate transporting and transferring such methodologies to various devices. Those skilled in the art will understand and appreciate that a method could alternatively be represented as a series of interrelated states or events, such as in a state diagram.

In general, a demand-based eMBMS method may be implemented using a system as shown and described in connection with FIG. 6. FIGS. 9A-G illustrate related methodologies for managing demand-based multicast services in a wireless communications system (WCS) capable of both unicast and multicast signaling. Method 900 shown in FIG. 9A describes operations preparatory to initiation of demand-based multicasting. The method 900 may include, at 902, establishing multicast areas for the content, in advance of providing the content via a unicast session. One or more network entities may set up the multicast area in advance of initiating a demand-based multicasting session, but the system need not initiate a multicast session yet. In the alternative, or in addition, a multicast area may be set up in response to demand, and then a multicast session may be initiated. The method 900 may further include, at 904, one or more network entities publishing availability of the content to the mobile entities, in advance of providing the content. This may correspond to the operation 702 described in connection with FIG. 7 above. The method 900 may further include, at 906, one or more network entities receiving service requests for the content published in operation 904 from a mobile entity.

Figure 9A:
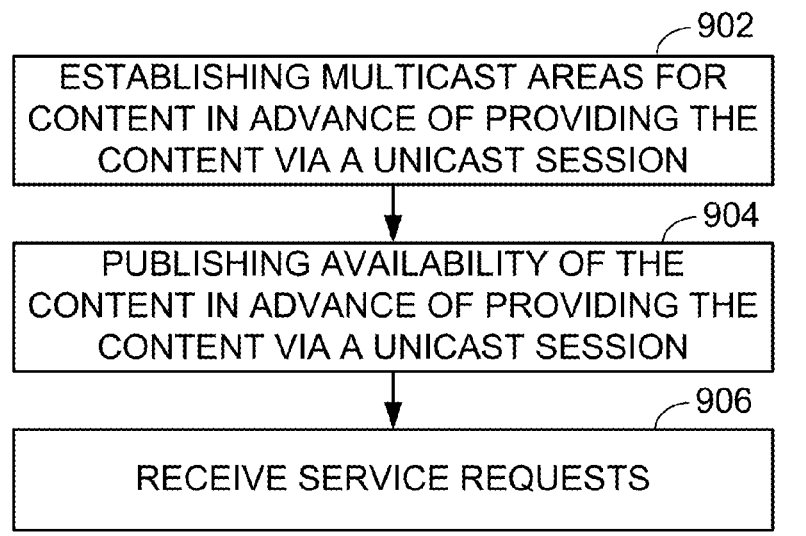
Figure 9B:
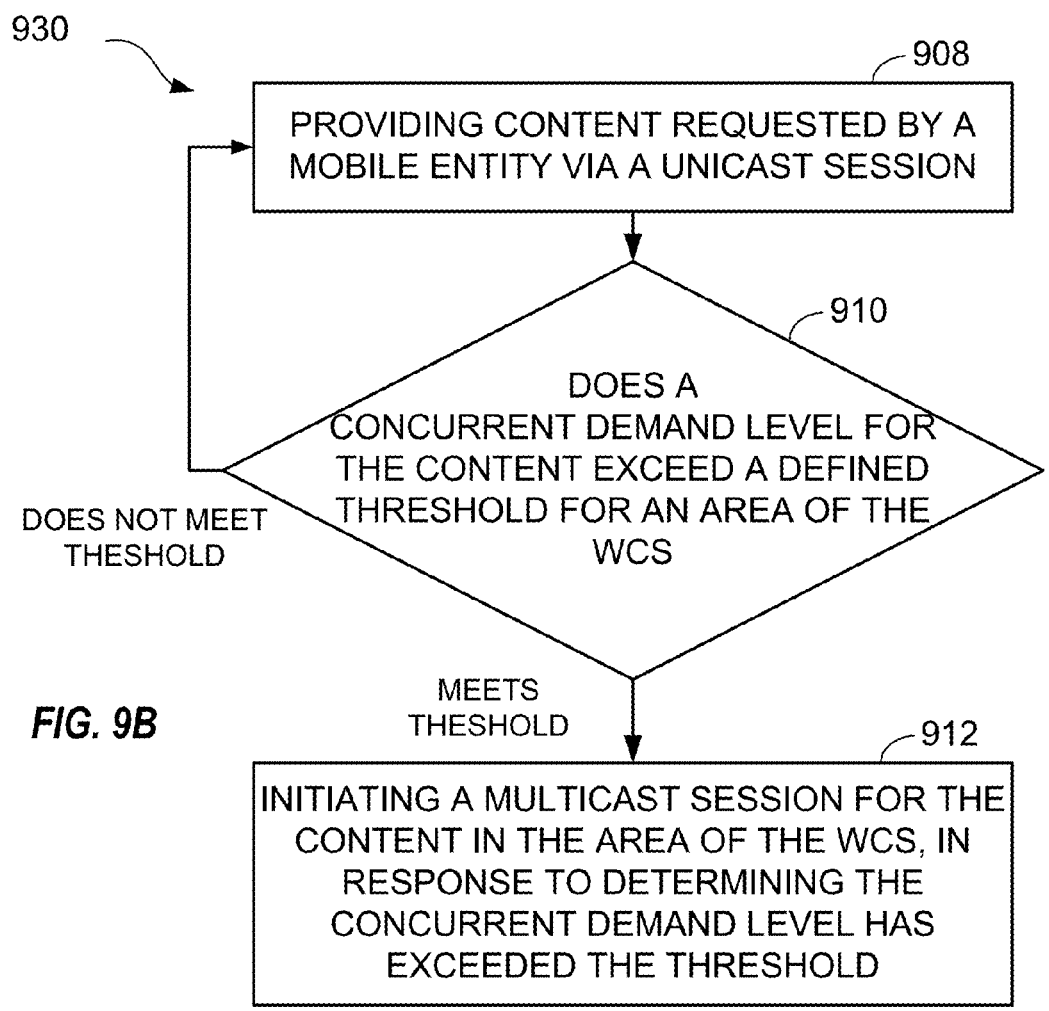

In addition, as illustrated in FIG. 9B, the system may perform a method 930 in which a multicast session is initiated in response to a demand level. Method 930 may include, at 908, one or more network entities providing content requested by a mobile entity via a unicast session. The content may be delivered to a base station and transmitted via unicast signaling to the mobile entity. This operation 908 may be repeated for multiple mobile entities in an MBSFN area. A demand level for the content may be equal to or related to a count of mobile entities receiving or requesting the content in a defined area and/or time envelope, or to some other estimate or measure of concurrent demand. A time envelope may be used to limit counts to concurrently receiving users and exclude users who are no longer receiving content. For example, a number of mobile entities receiving the content may be counted on a rolling average basis, and the rolling average may be used to determine a concurrent demand level. A wireless device may indicate interest in monitoring the content by setting up a unicast socket connection with the server. The wireless device may further send an http-GET request using a URL that represents the content the user is interested in. The period of the rolling average may be selected to be a value derived from the time to setup the broadcast channel to transmit that service. In the alternative, some other method may be used to decrement a count or other demand index to account for users no longer receiving content. For example, when the wireless device closes the unicast socket connection with the server, the number of users receiving the content may be decremented to subtract the wireless device from the number of users receiving the content. For example, when a download is completed by a user, a signal may be provided to an entity tracking the demand, and in response to the signal, the tracking entity may decrement a cumulative count of current demand.

The method 930 may further include, at 910, one or more network entities determining whether or not a concurrent demand level for the content exceeds a defined threshold for an area of the WCS. For example, if the demand level is defined as a count of concurrent users for specific content within a defined area, the system may monitor demand levels for one or more areas to determine when the count exceeds some threshold. The threshold may be fixed, or may vary as a function of system load or other factors. For example, when the unicast load is high, the threshold to switch from unicast to multicast may be low and vice versa. The method 930 may further include, at 912, one or more network entities that may initiate a multicast session for the content in the area of the WCS, in response to determining the concurrent demand level has exceeded the threshold. Thus, the system may shift the most highly demanded content for multicast delivery in a flexible fashion to improve efficiency in use of system resources.

In addition, the system may perform certain operations 940 after initiation of the multicast session in response to sufficient demand, as shown in FIG. 9C. These operations may include, at 914, one or more network entities stopping transmission over the unicast session for the mobile entity located in the multicast area of the wireless communication system, after initiating the multicast session in the multicast area. In addition, the operations may include continued demand monitoring to detect if the number of multicast users drops below a defined minimum threshold, at 915. In response to detecting that a number of mobile entities receiving the content via the multicast session has dropped below the defined threshold, the operations 940 may further include, at 916, resuming providing of the content via a unicast session, for a mobile entity receiving the content via the multicast session. Subsequently, the operations 940 may further include, at 918, stopping transmission over the multicast session after resuming provision of the content via the unicast session.

Monitoring of demand levels may be performed using various different methods. FIG. 9D illustrates one method 950 for demand monitoring, which may include, at 920, monitoring the concurrent demand level by counting a number of requests in the area of the WCS for the content received via respective base stations of the wireless communications system. This may include, as illustrated at 922, recognizing the requests for the content using a Uniform Resource Locator (URL) that is common to the requests from mobile entities. A base station or other network entity may count requests that share a common URL or other content address, within a rolling time envelope such as, for example, the last minute, the last ten minutes, or any desired rolling period. The method 950 may be generally understood as demand monitoring at the demand (e.g., mobile entity/base station) side of the system, where the number and location of mobile entities may be easily ascertained by the base station. Therefore the base station monitors the requests to determine which content is being requested by various mobile entities. The location of the users may be indicated to the counting module in the network using a new http header in the http-GET request. Alternatively, the location may be indicated to the counting module from the eNBs that are serving the wireless devices.

FIG. 9E illustrates an alternative method 960 for demand monitoring. Method 960 may include, at 924, a first network entity assigning the Internet Protocol (IP) addresses to the mobile entities so as to map to specified locations of the wireless communications system. As used herein, an IP address "maps" to a location when the address, or a portion of the address, indicates a definite location or limited area. The IP address may be assigned based on the UE location at the time the address is assigned. For example, the IP address may relate to a serving node or cell location. For example, the IP addresses may be assigned by the P-GW 610. The method 960 may further include, at 926, a second network entity monitoring the concurrent demand level by determining locations of the mobile entities from respective source IP addresses assigned to the mobile entities. The second network entity may be positioned to readily determine which content is being requested, for example, at a content provider or P-GW. The first network entity may be positioned to readily determine locations of mobile entities. The first and second network entities may be embodied in a common physical entity or may be embodied in separate physical entities. The method 960 may further include, at 928, the first entity determining locations of the mobile entities, e.g., from at least one of a cell identifier, Global Positioning System (GPS) information, tracking area identifier or cell group identifier. The method 960 may further include, at 929, redirecting a Domain Name System (DNS) request for content received from the mobile entity to a Broadcast Media Service Center (BM-SC). For example, a URL specifying a first content server may be redirected to a BM-SC using a DNS proxy. The method 960 may be generally understood as demand monitoring at the content source side of the system, with location mapped to IP addresses on the demand side. Other demand monitoring methods may be used, and the present technology is not limited to those described above.

FIG. 9F is a method 970 illustrating further aspects of the methodology for managing demand-based multicast services in a WCS capable of both unicast and multicast signaling. The method may be performed by a base station, a BM-SC, a high attach rate detection module (HDM) (see FIGS. 13A-C and 14 below), or other network entity. The method 970 may include, at 932, determining a number of subscribers to a service in a wireless communication network. The method 970 may further include, at 934, comparing the number of subscribers to a predetermined threshold value. The method 970 may further include, at 936, if the service is currently being provided in a broadcast or multicast mode, and if the number of subscribers is below the predetermined threshold value, initiating a transition to a unicast mode by sending a modified content designator in response to a request for content of the service from one or more subscribers included in the number of subscribers. The method 970 may further include, at 938, if the service is currently being provided in a unicast mode, and if the number of subscribers exceeds the predetermined threshold value, initiating a transition to a broadcast or multicast mode by sending the modified content designator in response to the request for content of the service from one or more subscribers included in the number of subscribers. The modified content designator may be sent via the unicast mode. Threshold hysteresis may be configured to prevent ping-ponging between set up and tear down of the eMBMS session. The threshold values may be set based on a number of subscribers, number of cells, and/or a hysteresis range. For example, the number of subscribers in an area may exceed a first threshold T1, and then delivery of the content is switched from unicast mode to broadcast or multicast mode. Then, the number of subscribers in the area may drop to less than a second threshold T2, where delivery of the content is switched from broadcast or multicast mode to unicast mode. The first threshold T1 may be greater than the second threshold T2. For example, the first threshold T1 may be defined as 100, with T2 defined as 70 for a hysteresis range (T1-T2) of 30.

Figure 9G:
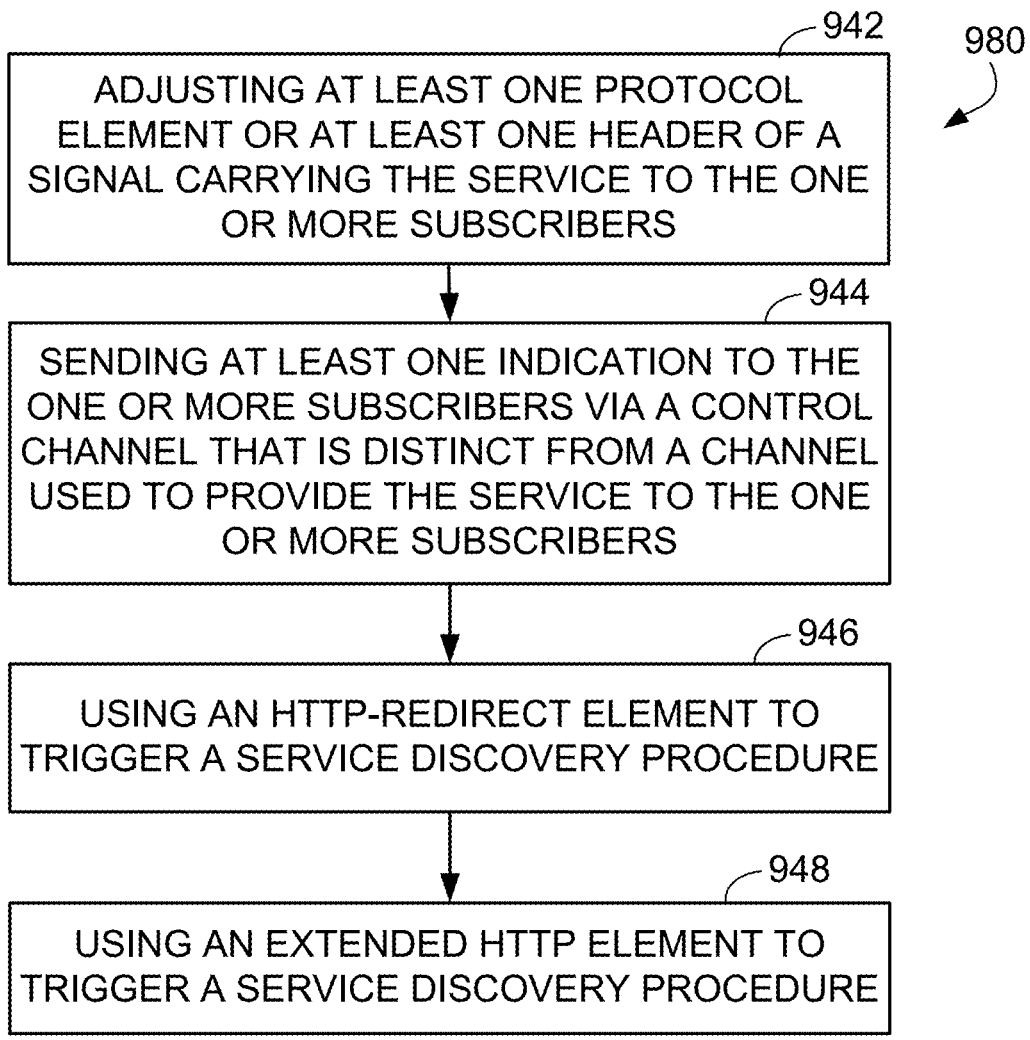

Additional operations 980 for managing demand-based multicast services are illustrated in FIG. 9G. One or more of operations 980 may optionally be performed as part of method 970. The operations 980 may be performed in any operative order, or may be encompassed by a development algorithm without requiring a particular chronological order of performance. Operations are independently performed and not mutually exclusive. Therefore any one of such operations may be performed regardless of whether another downstream or upstream operation is performed. For example, if the method 970 includes at least one of the operations 980, then the method 970 may terminate after the at least one operation, without necessarily having to include any subsequent downstream operation(s) that may be illustrated.

Referring to FIG. 9G, the additional operations 980 may include, at 942, adjusting at least one protocol element or at least one header of a signal carrying the service to the one or more subscribers. Operations 980 may further include, at 944, sending at least one indication to the one or more subscribers via a control channel that is distinct from a channel used to provide the service to the one or more subscribers. For example, the indication may signal a transition or command the UE to transition from the unicast one mode to broadcast mode or from broadcast mode to unicast mode. Operations 980 may further include, at 946, using an http-REDIRECT element to trigger a service discovery procedure. Operations 980 may further include, at 948, using an extended http element to trigger a service discovery procedure.

Figure 9H:
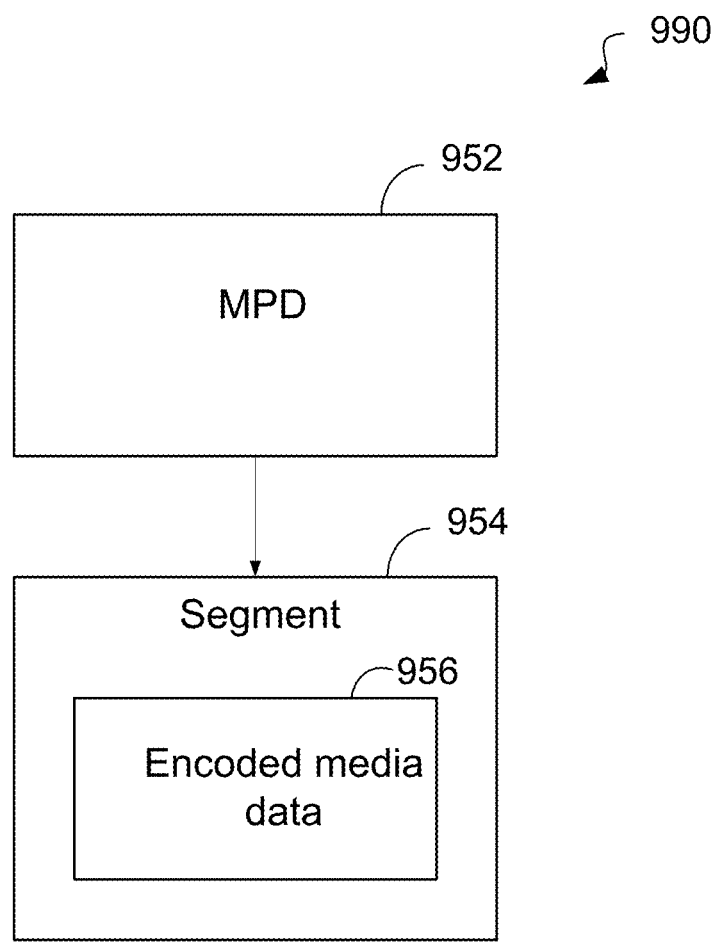
FIG. 9H is a block diagram illustrating aspects of a DASH protocol pertinent to delivery of multimedia content.

FIG. 9H is a block diagram illustrating aspects of a DASH protocol pertinent to delivery of multimedia content 990. Multimedia content 990 may exist in two parts: metadata (also called a header) in the form of an MPD 952, and segments 954 containing the actual encoded media data 956 as a multimedia bitstream. The MPD 952 may be delivered to a client along with other service description metadata, either in response to a unicast get request, or via broadcast delivery. These metadata items are not part of the media data fetch. At least one of the segments 954 (e.g., a first segment) may be an Initialization Segment (IS), without encoded media data 956, defining details of the data format for the other segments 954. The MPD 952 may describe a URL address from which to fetch media data for the UE, for unicast delivery. Alternatively, the URL address may appear on the receiving device for broadcast delivery. Broadcast delivery may feed a cache on the UE.

Figure 9I:
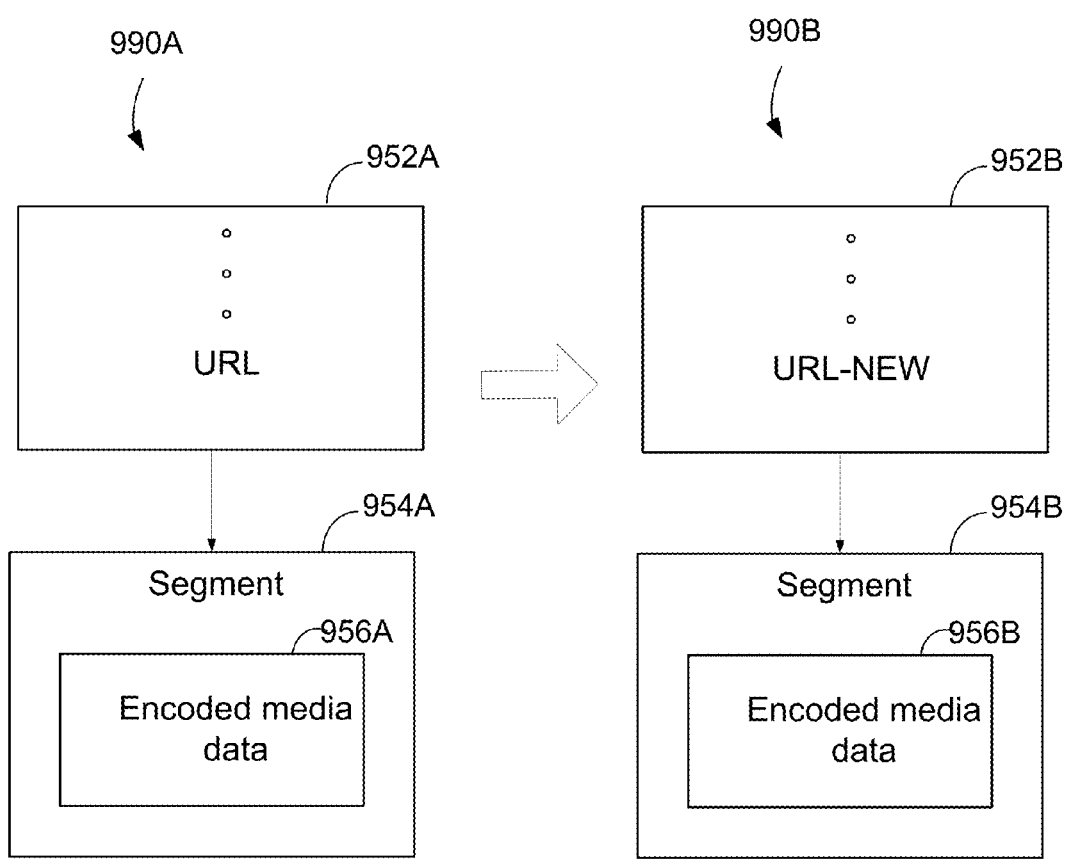
FIG. 9I illustrates an exemplary modification of content designator of multimedia content 950A-B.

FIG. 9I illustrates an exemplary modification of content designator for multimedia content 990A-B. A range of changes allowed to the MPD 952 by a network entity may include, for example, modifying the description from 952A to 952B, including modifying a content designator (e.g., URL to URL-NEW) of the multimedia content. The modified description may include a new URL for locating the multimedia content 990B. The segment information and encoded media data may be unchanged from 954A to 954B and 956A to 956B, respectively.

Figure 10A:
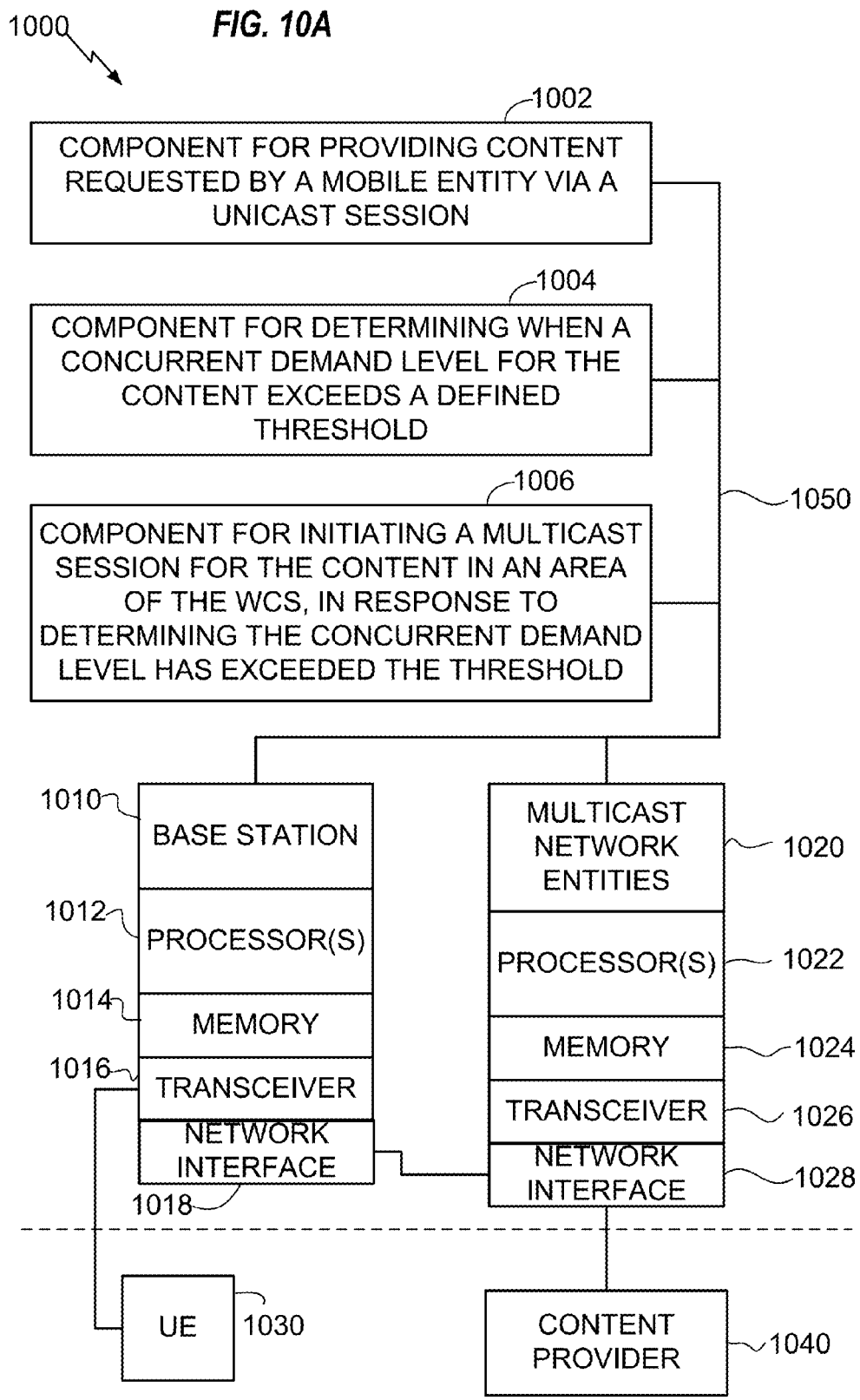

With reference to FIG. 10A, there is provided an exemplary system 1000 for managing demand-based multicast services in a wireless communications system capable of both unicast and multicast signaling, that may be configured as a wireless network capable of unicast and multicast signaling, or as a processor or similar device for use within entities of the network. The network entities may include a base station 1010 (e.g., eNB, or other base station (e.g., Home Node B, etc.)) of a wireless communications network, which may be in communication with a mobile entity 1030 via a transceiver 1016. The system may also include one or more multicast network entities 1020 as described above, for example, a BM-SC, P-GW, MME, MCE, HDM, and so forth, at least one of which may be linked to a content provider 1040 via a network interface 1028. The system 1000 may include functional blocks that can represent functions implemented by a processor, software, hardware, or combination thereof (e.g., firmware).

As illustrated, in one embodiment, the system 1000 may include an electrical component or module 1002 for providing content requested by a mobile entity in an area of the WCS via a unicast session. For example, when the system 1000 is coupled to or configured as a base station 1010, the electrical component 1002 may include at least one processor 1012 coupled to a transceiver 1016 or the like and to a memory 1014 with instructions for providing the requested content via unicast signaling. For example, when the system 1000 is coupled to or configured as one or more multicast network entities, the electrical component 1002 may include at least one processor 1022 coupled to a transceiver 1026 or the like and to a memory 1024 with instructions for providing the requested content via unicast signaling. The system 1000 may include an electrical component 1004 for determining that a concurrent demand level for the content exceeds a defined threshold for the area of the WCS. For example, the electrical component 1004 may include at least one processor 1012, 1022 coupled to a transceiver 1016, 1026 or the like and to a memory 1014, 1024 holding instructions for monitoring concurrent demand levels for specific content within specified areas and comparing to a threshold. The system 1000 may include an electrical component 1006 for initiating a multicast session for the content in the area of the wireless communications system, in response to determining the concurrent demand level has exceeded the threshold. For example, the electrical component 1006 may include at least one processor 1012, 1022 coupled to a transceiver 1016, 1026 or the like and to a memory 1014, 1024 holding instructions for initiating a multicast session in a specified area, in response to a control signal. The system 1000 may include similar electrical components for performing any or all of the additional operations 900, 940, 950, 960 described in connection with FIGS. 9A and 9C-D, which for illustrative simplicity are not shown in FIG. 10A.

The components 1002-1006 may be related via a logical link 1050 to one or more eNBs 1010 and/or to one or more multicast network entities 1020. The link 1050 to both of the elements 1010, 1020 indicates that each element may involve the eNB 1010, one or more of the multicast network entities 1020, or both. For example, the component 1002 for providing content requested by a mobile entity in an area of the WCS via a unicast session may involve the eNB and one or more of the network entities HDM, MBMS-GW, BM-SC, P-GW, MCE, and MME discussed above in connection with FIG. 6, or similar entities. Therefore the components 1002-1006 are not necessarily limited to one processor entity of a wireless communications system, and may be embodied, in whole or in part, by different processing entities of the system operating in cooperation via a logical link 1050. The logical link is not necessarily limited to a single communications link or interface, and may include more than one communication link or interface, for example as described in connection with FIG. 6 above showing different interfaces between different system elements.

In related aspects, the system 1000 may optionally include processor components 1012, 1022 each having at least one processor. The processors 1012 and 1022 may be in operative communication with the components 1002-1006 or similar components via any suitable communication coupling. As noted above, more than one of the eNB 1010 or the multicast network entities 1020 may include a portion of the components 1002-1006. Accordingly, the processors 1012 and 1022 may effect initiation and scheduling of the processes or functions performed by electrical components 1002-1006.

In further related aspects, the system 1000 may include radio transceiver components 1016, 1026 and network interface components 1018, 1028. The system 1000 may optionally include components for storing information, such as, for example, memory devices/components 1014, 1024. The computer readable medium or the memory components 1014, 1024 may be operatively coupled to the other components of the system 1000 via a bus or other coupling. The memory components 1014, 1024 may be adapted to store computer readable instructions and data for performing the activity of the components 1002-1006, and subcomponents thereof, or the processors 1012, 1022, the additional operations 900, 940, 950, 960, or the methods disclosed herein. The memory components 1014, 1024 may retain instructions for executing functions associated with the components 1002-1006. While shown as being external to the memory 1014, 1024, it is to be understood that the components 1002-1006 can exist within the memory 1014, 1024.

FIG. 10B is similar to FIG. 10A, and corresponding components are shown with the same reference numbers. FIG. 10B also shows an exemplary system 1000B for managing demand-based multicast services in a wireless communications system capable of both unicast and multicast signaling, that may be configured as wireless network capable of unicast and multicast signaling, or as a processor or similar device for use within entities of the network. However, FIG. 10B shows the components in the context in which the provision of content may initially be via a multicast session, and where provision of the content may be transitioned to unicast sessions. Again, the system 1000B may include functional blocks that can represent functions implemented by a processor, software, hardware, or combination thereof (e.g., firmware).

As illustrated, in one embodiment, the system 1000B may include an electrical component or module 1002B for providing content requested by mobile entities in an area of the WCS via a multicast session. For example, when the system 1000B is coupled to or configured as a base station 1010, the electrical component 1002B may include at least one processor 1012 coupled to a transceiver 1016 or the like and to a memory 1014 with instructions for providing the requested content via multicast signaling. For example, when the system 1000B is coupled to or configured as one or more multicast network entities, the electrical component 1002B may include at least one processor 1022 coupled to a transceiver 1026 or the like and to a memory 1024 with instructions for providing the requested content via unicast signaling. The system 1000B may include an electrical component 1004B for determining whether or not a concurrent demand level for the content falls below a defined threshold for the area of the WCS. For example, the electrical component 1004B may include at least one processor 1012, 1022 coupled to a transceiver 1016, 1026 or the like and to a memory 1014, 1024 holding instructions for monitoring concurrent demand levels for specific content within specified areas and comparing to a threshold. The system 1000B may include an electrical component 1006B for initiating unicast sessions for the content in the area of the wireless communications system, in response to determining the concurrent demand level has fallen below the threshold. That is, the mobile entities that continue to wish to receive the content may be provided with the content via such unicast sessions. For example, the electrical component 1006B may include at least one processor 1012, 1022 coupled to a transceiver 1016, 1026 or the like and to a memory 1014, 1024 holding instructions for initiating a multicast session in a specified area, in response to a control signal. The system 1000B may include similar electrical components for performing any or all of the additional operations 900, 940, 950, 960 described in connection with FIGS. 9A and 9C-D, which for illustrative simplicity are not shown in FIG. 10B. It is further noted that components shown in FIG. 10A and FIG. 10B performing similar functions may be shared between the functions shown in FIG. 10A and FIG. 10B.

With reference to FIG. 10C, there is provided another exemplary system 1060 for managing demand-based multicast services in a wireless communications system capable of both unicast and multicast signaling, that may be configured as a wireless network, or as a processor or similar device for use within entities of the network. The network entities may include a base station 1010 (e.g., eNB, or other base station (e.g., Home Node B, etc.)) of a wireless communications network, which may be in communication with a mobile entity 1030 via a transceiver 1016. The system may also include one or more multicast network entities 1020 as described above, for example, an HDM, BM-SC, P-GW, MME, MCE, and so forth, at least one of which may be linked to a content provider 1040 via a network interface 1028. The system 1060 may include functional blocks that can represent functions implemented by a processor, software, hardware, or combination thereof (e.g., firmware).

As illustrated, in one embodiment, the system 1060 may include an electrical component or module 1052 for determining a number of subscribers to a service in a wireless communication network. For example, the electrical component 1052 may include at least one processor 1012, 1022 coupled to a transceiver 1016, 1026 or the like and to a memory 1014, 1024 with instructions for determining a number of subscribers, in one or both of the base station 1010 and network entities 1020. The system 1060 may include an electrical component 1054 for comparing the number of subscribers to a predetermined threshold value. The system 1060 may include an electrical component 1056 for initiating a transition to a unicast mode by sending a modified content designator in response to a request for content of the service from one or more subscribers included in the number of subscribers if the service is currently being provided in a broadcast or multicast mode, and if the number of subscribers is below the predetermined threshold value. For example, the electrical component 1056 may include at least one processor 1012, 1022 coupled to a transceiver 1016, 1026 or the like and to a memory 1014, 1024 holding instructions for initiating the transition. The system 1060 may include an electrical component 1058 for initiating a transition to a broadcast or multicast mode by sending the modified content designator via a unicast mode in response to the request for content of the service from one or more subscribers included in the number of subscribers if the service is currently being provided in the unicast mode, and if the number of subscribers exceeds the predetermined threshold value. For example, the electrical component 1058 may include at least one processor 1012, 1022 coupled to a transceiver 1016, 1026 or the like and to a memory 1014, 1024 holding instructions for initiating the transition.

The components 1052-1058 may be related via a logical link 1050 to one or more eNBs 1010 and/or to one or more multicast network entities 1020. The link 1050 to both of the elements 1010, 1020 indicates that each element may involve the eNB 1010, one or more of the multicast network entities 1020, or both. For example, the component 1052 for determining the number of subscribers may involve the eNB and one or more of the network entities MBMS-GW, BM-SC, P-GW, MCE and MME discussed above in connection with FIG. 6, or similar entities. Therefore the components 1052-1058 are not necessarily limited to one processor entity of a wireless communications system, and may be embodied, in whole or in part, by different processing entities of the system operating in cooperation via a logical link 1050. The logical link is not necessarily limited to a single communications link or interface, and may include more than one communication link or interface, for example as described in connection with FIG. 6 above showing different interfaces between different system elements.

In related aspects, the system 1060 may optionally include processor components 1012, 1022 each having at least one processor. The processors 1012 and 1022 may be in operative communication with the components 1052-1058 or similar components via any suitable communication coupling. As noted above, more than one of the eNB 1010 or the multicast network entities 1020 may include a portion of the components 1052-1058. Accordingly, the processors 1012 and 1022 may effect initiation and scheduling of the processes or functions performed by electrical components 1052-1058.

In further related aspects, the system 1060 may include radio transceiver components 1016, 1026 and network interface components 1018, 1028. The system 1060 may optionally include components for storing information, such as, for example, memory devices/components 1014, 1024. The computer readable medium or the memory components 1014, 1024 may be operatively coupled to the other components of the system 1000 via a bus or other coupling. The memory components 1014, 1024 may be adapted to store computer readable instructions and data for performing the activity of the components 1052-1058, and subcomponents thereof, or the processors 1012, 1022, or the methods disclosed herein. The memory components 1014, 1024 may retain instructions for executing functions associated with the components 1052-1058. While shown as being external to the memory 1014, 1024, it is to be understood that the components 1052-1058 can exist within the memory 1014, 1024.

With reference to FIG. 10D, there are shown further optional components or modules of the system 1060. For example, the system 1060 may further include an electrical component or module 1062 for adjusting at least one protocol element or at least one header of a signal carrying the service to the one or more subscribers. The system 1060 may further include an electrical component or module 1064 for sending at least one indication to the one or more subscribers via a control channel that is distinct from a channel used to provide the service to the one or more subscribers. For example, the indication may signal a transition or command the UE to transition from the unicast one mode to broadcast mode or from broadcast mode to unicast mode. For example, the electrical component 1064 may include at least one processor 1012, 1022 coupled to a transceiver 1016, 1026 or the like and to a memory 1014, 1024 holding instructions for sending the at least one indication. The system 1060 may further include an electrical component or module 1066 for using an http-REDIRECT element to trigger a service discovery procedure. For example, the electrical component 1066 may include at least one processor 1012, 1022 coupled to a transceiver 1016, 1026 or the like and to a memory 1014, 1024 holding instructions for using the http-REDIRECT element. The system 1060 may further include an electrical component or module 1068 for using an extended http element to trigger a service discovery procedure. For example, the electrical component 1066 may include at least one processor 1012, 1022 coupled to a transceiver 1016, 1026 or the like and to a memory 1014, 1024 holding instructions for using the extended http element.

Figure 11A:
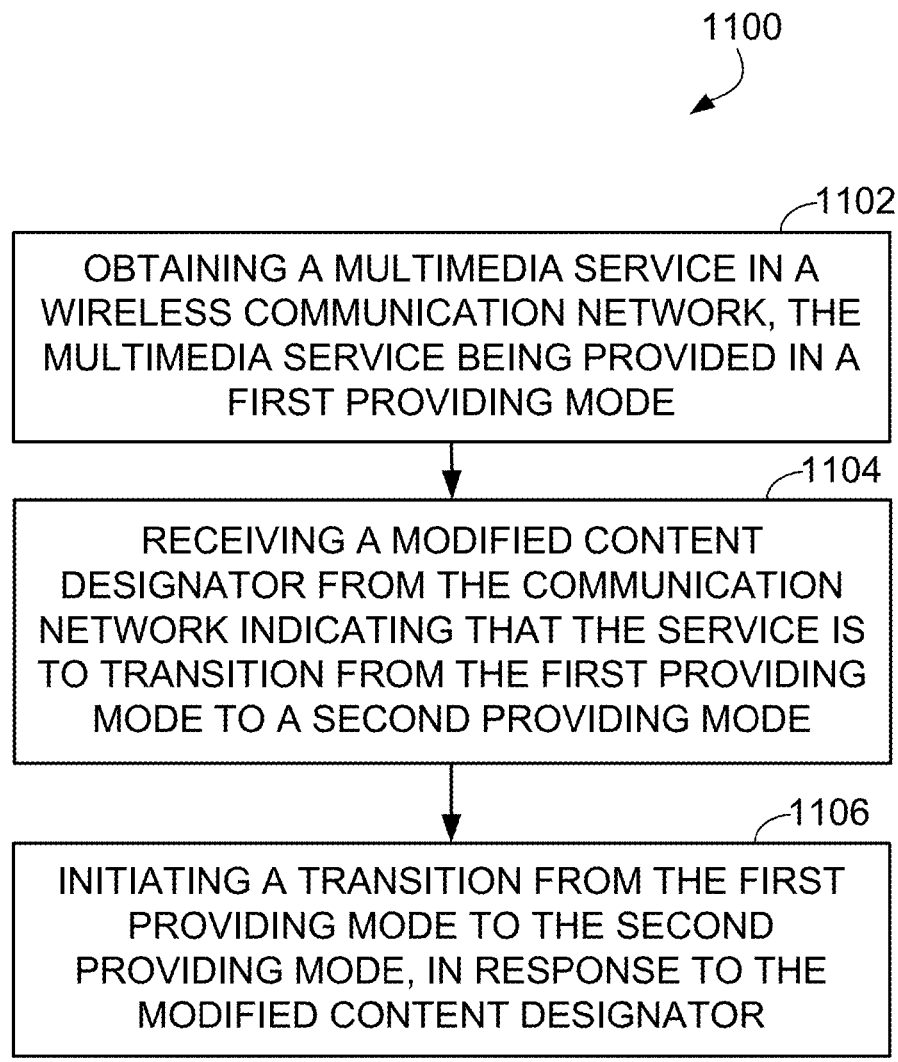
FIGS. 11A and 11B illustrate embodiments of methodologies for transitioning between receiving content via multicast delivery of a service and unicast delivery of the service in a wireless communications system.
Figure 11B:
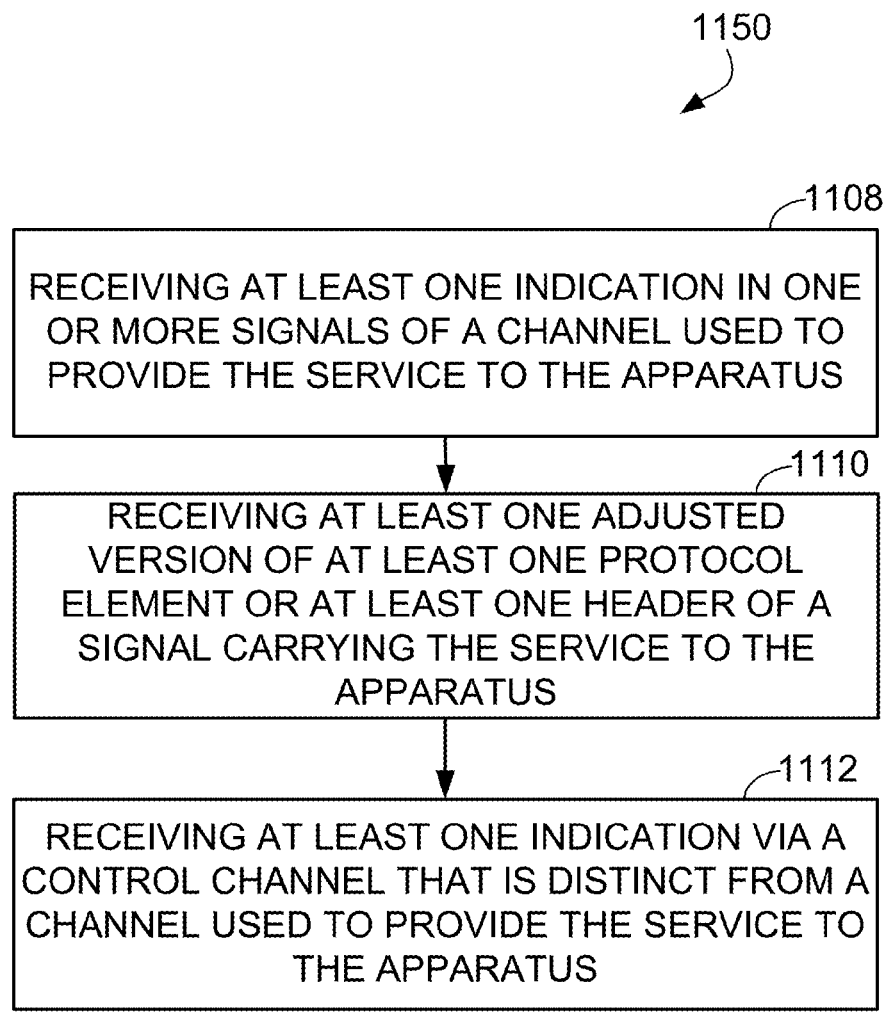

FIGS. 11A and 11B illustrate further embodiments of methodologies for transitioning between receiving content via multicast delivery of a service and unicast delivery of the service in a wireless communications system. The method may be performed by a UE, a mobile entity, wireless terminal, or the like. The method 1100 may include, at 1102, obtaining a multimedia service in a wireless communication network, the multimedia service being provided in a first providing mode. The method 1100 may further include, at 1104, receiving a modified content designator from the communication network indicating that the service is to transition from the first providing mode to a second providing mode. For example, the modified content designator may reflect a comparison of a number of terminals subscribing to the multimedia service in the first providing mode with a predetermined threshold value. The method 1100 may further include, at 1106, initiating a transition from the first providing mode to the second providing mode, in response to the modified content designator.

Additional operations 1150 for implementing transitioning between receiving content via multicast delivery of a service and unicast delivery of the service are illustrated in FIG. 11B. One or more of operations 1150 may optionally be performed as part of method 1100. The operations 1150 may be performed in any operative order, or may be encompassed by a development algorithm without requiring a particular chronological order of performance. Operations are independently performed and not mutually exclusive. Therefore any one of such operations may be performed regardless of whether another downstream or upstream operation is performed. For example, if the method 1100 includes at least one of the operations 1150, then the method 1100 may terminate after the at least one operation, without necessarily having to include any subsequent downstream operation(s) that may be illustrated.

Referring to FIG. 11B, the additional operations 1150 may include, at 1108, receiving at least one indication in one or more signals of a channel used to provide the service to the apparatus. For example, the indication may signal a transition or command the UE to transition from the unicast one mode to broadcast mode or from broadcast mode to unicast mode. Operations 1150 may further include, at 1110, receiving at least one adjusted version of at least one protocol element or at least one header of a signal carrying the service to the apparatus. Operations 1150 may further include, at 1112, receiving at least one indication via a control channel that is distinct from a channel used to provide the service to the apparatus.

Figure 12A:
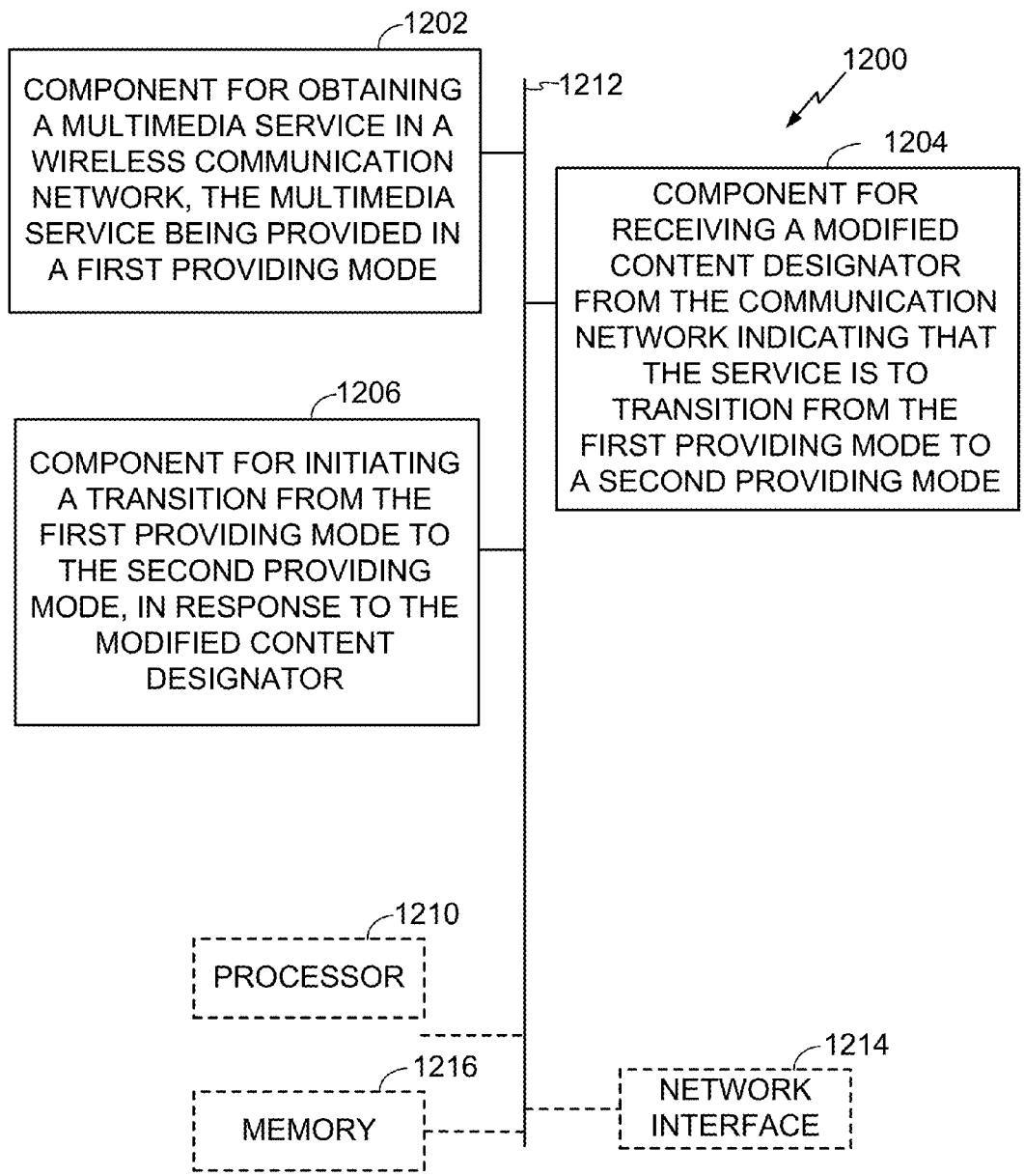
FIGS. 12A and 12B illustrate examples of systems for implementing the methodologies of FIGS. 11A and 11B.

With reference to FIG. 12A, there is provided an exemplary apparatus 1200 for transitioning between receiving content via multicast delivery of a service and unicast delivery of the service, where the apparatus 1200 may be configured as a UE, a mobile entity, wireless terminal, or the like, or as a processor or similar device for use within the UE, a mobile entity, wireless terminal, or the like. The apparatus 1200 may include functional blocks that can represent functions implemented by a processor, software, hardware, or combination thereof (e.g., firmware).

As illustrated, in one embodiment, the apparatus 1200 may include an electrical component or module 1202 for obtaining a multimedia service in a wireless communication network, the multimedia service being provided in a first providing mode. For example, the electrical component or module 1202 may include at least one processor 1210 coupled to a network interface 1214 (e.g., transmitter, receiver, transceiver) or the like and to a memory 1216 with instructions for obtaining the multimedia service. The apparatus 1200 may include an electrical component or module 1204 for receiving a modified content designator from the communication network indicating that the service is to transition from the first providing mode to a second providing mode. For example, the modified content designator may reflect a comparison of a number of terminals subscribing to the multimedia service in the first providing mode with a predetermined threshold value. For example, the electrical component 1204 may include at least one processor 1210 coupled to a network interface 1214 (e.g., transmitter, receiver, transceiver) or the like and to a memory 1216 holding instructions for receiving the modified content designator. The apparatus 1200 may include an electrical component or module 1206 for initiating a transition from the first providing mode to the second providing mode, in response to the modified content designator.

In related aspects, the apparatus 1200 may optionally include a processor component 1210 having at least one processor, in the case of the apparatus 1200 configured as a UE, a mobile entity, wireless terminal, or the like. The processor 1210, in such case, may be in operative communication with the components 1202-1204 or similar components via a bus 1212 or similar communication coupling. The processor 1210 may effect initiation and scheduling of the processes or functions performed by electrical components or modules 1202-1204.

In further related aspects, the apparatus 1200 may include a network interface component 1214 for communicating with other network entities. The network interface 1214 may be a transmitter, receiver, or transceiver. The apparatus 1200 may optionally include a component for storing information, such as, for example, a memory device/component 1216. The computer readable medium or the memory component 1216 may be operatively coupled to the other components of the apparatus 1200 via the bus 1212 or the like. The memory component 1216 may be adapted to store computer readable instructions and data for performing the activity of the components 1202-1204, and subcomponents thereof, or the processor 1210, the additional operations 1200, 1300 and 1400, or the methods disclosed herein. The memory component 1216 may retain instructions for executing functions associated with the components 1202-1204. While shown as being external to the memory 1216, it is to be understood that the components 1202-1204 can exist within the memory 1216.

Figure 12B:
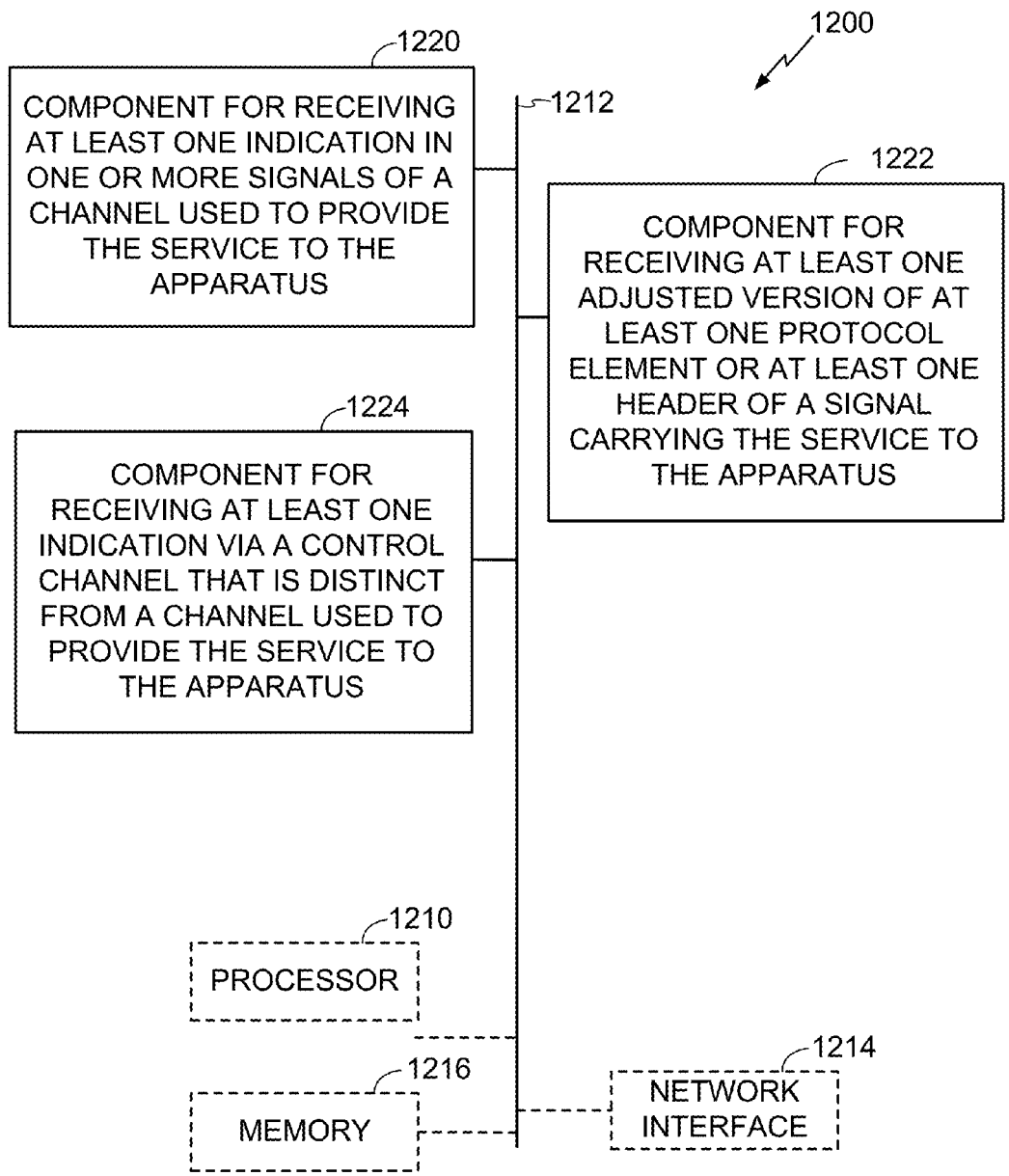

With reference to FIG. 12B, there are shown further optional components or modules of the apparatus 1200. The apparatus 1200 may further include an electrical component or module 1220 for receiving at least one indication in one or more signals of a channel used to provide the service to the apparatus. For example, the indication may signal a transition or command the UE to transition from the unicast one mode to broadcast mode or from broadcast mode to unicast mode. For example, the electrical component or module 1220 may include at least one processor 1210 coupled to a network interface 1214 (e.g., transmitter, receiver, transceiver), or the like and to a memory 1216 with instructions for receiving the at least one indication. The apparatus 1200 may further include an electrical component or module 1222 for receiving at least one adjusted version of at least one protocol element or at least one header of a signal carrying the service to the apparatus. For example, the electrical component or module 1222 may include at least one processor 1210 coupled to a network interface 1214 (e.g., transmitter, receiver, transceiver), or the like and to a memory 1216 with instructions for receiving the at least one adjusted version. The apparatus 1200 may further include an electrical component or module 1224 for receiving at least one indication via a control channel that is distinct from a channel used to provide the service to the apparatus. For example, the electrical component or module 1224 may include at least one processor 1210 coupled to a network interface 1214 (e.g., transmitter, receiver, transceiver), or the like and to a memory 1216 with instructions for receiving the at least one indication.

Example Methodologies for Transitions Between Modes

As noted above, in systems that support demand-based MBMS, it may be more efficient to provide given content via either a multicast session to multiple mobile entities or via separate unicast sessions to the mobile entities. The relative efficiencies of providing multicast or unicast service may relate to a demand level, e.g., how many mobile entities are receiving and/or would like to receive the given content. One issue that may arise is how to arrange transitions between these modes of content delivery, once it has been determined that such a transition may be desired. The following sections address some exemplary approaches to this issue.

As a preliminary, there are multiple content delivery techniques that may be used. For example, Dynamic Adaptive Streaming over HTTP (DASH) or the Real-Time Protocol (RTP) may be employed. The exemplary techniques are discussed below primarily in the context of DASH, but they are similarly applicable to systems employing RTP, and where applicable, discussions of differences are provided below.

In discussing techniques for transitioning between modes of delivery, one may divide the relevant signaling into two classes, which will be referred to below as in-service (or in-band) signaling and out-of-service (or out-of-band) signaling. In in-service signaling, signals relating to the transition may be embedded in the normal traffic associated with providing the service. In out-of-service signaling, signals relating to the transition may be transmitted outside of the normal traffic associated with providing the service, for example, in a separate channel. Either or both of these signaling techniques may be used in various schemes for implementing transitions between unicast and multicast operation.

Figure 13A:
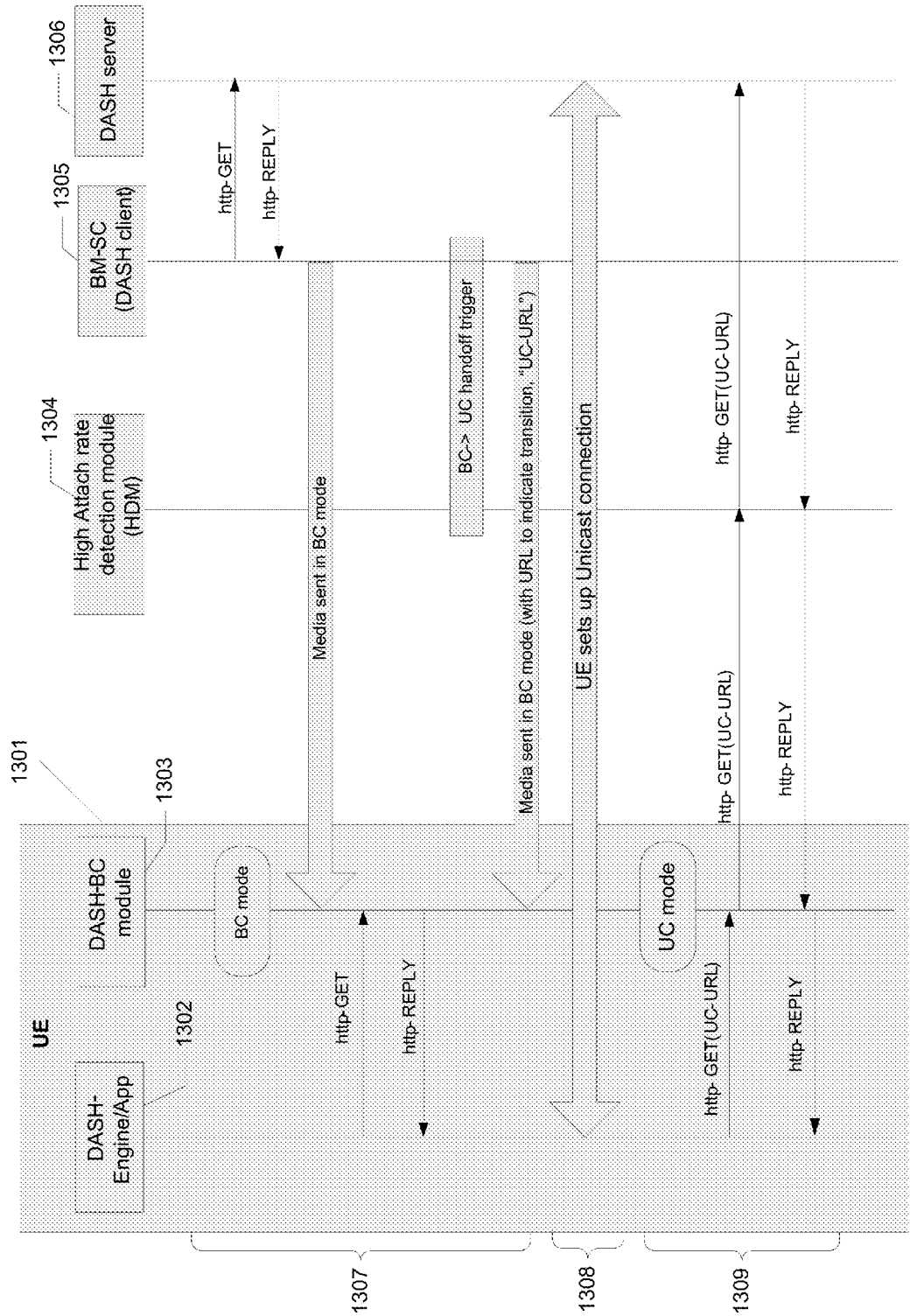
FIGS. 13A-13C and 14 are sequence diagrams illustrating activity by various components of a wireless communications system implementing an approach to transitioning between multicast delivery of a service and unicast delivery of the service, according to various embodiments of the disclosure.

FIG. 13A illustrates an exemplary in-service signaling approach to transitioning from a multicast (also referred to as broadcast) session to separate unicast sessions, according to an embodiment of the disclosure. As noted above, FIG. 13A shows this approach in the context of DASH, but it may be applicable to RTP-based systems, as well. FIG. 13A shows a UE 1301 that may include a DASH engine/application 1302 and a DASH-broadcast (DASH-BC) module 1303. Also shown are a BM-SC 1305, which, in the case of DASH, may be characterized as a DASH client, and a DASH server 1306, which may provide the content to BM-SC 1305. A further component shown in FIG. 13A may be a high attach rate detection module (HDM) 1304. This may be a separate physical or logical element of the network (which may be, for example, shown as being provided between P-GW 610 and BM-SC 612 of FIG. 6), or it may be incorporated into a network element, such as the P-GW 610 or the BM-SC 612. Functions of HDM 1304 may include maintaining counts of numbers of UEs subscribing to various multimedia services being offered.

During multicast/broadcast mode, as indicated by reference numeral 1307, multimedia content may be delivered to UE 1301 using DASH over a File Delivery over Unidirectional Transport (FLUTE) channel. In DASH, content may be broken up into segments, which may be, for example, 5-10 seconds long (but the disclosure is not thus limited), and each DASH segment is assigned a content designator, such as a URL. The URLs may be stored in a file delivery table (FDT) of a FLUTE channel that may be used to deliver the DASH content. In this protocol, BM-SC 1305 may send an http-GET message to DASH server 1306, to obtain a next segment of the content to be delivered to UE 1301. DASH server 1306 may respond with an http-REPLY message that may forward content to BM-SC 1305, which may arrange broadcast of the content, including an associated URL for a given segment, to multiple UEs, which may include UE 1301. Within UE 1301, DASH engine 1302 may interact with DASH-BC module 1303 to provide the content to the user of the UE 1301. This may be done by means of http-GET/http-REPLY messages, which may be similar to the interaction between BM-SC 1305 and DASH server 1306. For example, DASH engine 1302 may send an http-GET message to the DASH-BC module 1303 to obtain a next segment of the content. DASH-BC module 1303 may respond with an http-REPLY message that may forward content to the DASH engine 1302.

At some point, HDM 1304 may provide a count of UEs subscribing to the particular multimedia service to enable a network element, which may be HDM 1304 or may be another network element, e.g., a network element as shown in FIG. 6, to determine if the demand for the service has fallen below a threshold number of UEs. If so, a transition from multicast to unicast mode may be triggered. In this case, the BM-SC or another network element that generates the broadcast segments may broadcast the content to the UEs with a modified URL; such a modified URL may be stored in the FDT, and/or it may be generated upon the triggering of the transition. The modified URL may be based on, for example, a media presentation description (MPD) representation, and may be constructed with semantics to instruct the UEs receiving it to initiate a transition to unicast mode. Alternatively, the modified URL may be an explicit indication using the ASCII characters used to represent the URL. This can be achieved, for example, by inserting the string, "BCtoUC" in the URL string. Such a modified URL may be, for example, a unicast URL or a URL that indicates transition from broadcast/multicast mode to unicast mode. In yet another embodiment, the BM-SC or another network element that generates the broadcast segments can indicate to the MME to use a unicast message to signal to the wireless device that the service transmitted over the broadcast channel will soon transition to a unicast mode. In both cases, the network may send the modified URL to the wireless device using the File Delivery Table (FDT) of the FLUTE protocol.

A modified URL according to some embodiments may be obtained, e.g., by changing an MPD attribute. In general, MPD may include an attribute relating to how a URL is constructed. This attribute may be different for different types of URLs. For example, the attribute may differ for unicast mode, broadcast mode, broadcast-to-unicast mode transition and/or broadcast-to-unicast mode transition (noting that it may be possible, in some embodiments, to have a single attribute that indicates a "generic" transition from a current mode to the other mode, which, in itself, may be modifiable, as necessary, to specify further information relating to the transition). That is, a modified URL may involve the use of a different MPD attribute, which may thus result in a different URL format.

UE 1301 may then establish a unicast session 1308 and cease reception of the broadcast transmission of the service. The unicast session may then proceed 1309 by the transmission of successive http-GET and http-REPLY messages from and to the DASH engine 1302, respectively. The http-GET messages may incorporate unicast URLs (shown as "UC-URL" in FIG. 13A) to request the desired content; such http-GET messages are designated "http-GET(UC-URL)" in FIG. 13A. DASH-BC module 1303 may forward these http-GET(UC-URL) messages without processing. Similarly, the BM-SC 1305 may also not process these http-GET(UC-URL) messages; and the http-GET(UC-URL) messages may be forwarded to DASH server 1306 for retrieval of content. The process may proceed similarly in the opposite direction, with DASH server 1306 providing an http-REPLY message (in response to an http-GET(UC-URL)) to provide content corresponding to the UC-URL provided in the http-GET(UC-URL) message, and this may be furnished to UE 1301, again without broadcast processing (e.g, by BM-SC 1305 and/or DASH-BC module 1303). Note that, while shown in FIG. 13A as bypassing BM-SC 1305, in an alternative embodiment, the http-GET(UC-URL) and http-REPLY messages may be received by the BM-SC 1305 and forwarded in the appropriate direction, with or without involvement of the HDM 1304 in this process. Meanwhile, HDM 1304 may continue to maintain counts of UEs obtaining various multimedia services, which may be used, e.g., to enable a determination of whether to transition back to a broadcast mode. In yet another embodiment, the network may stop transmitting the content on broadcast channel. The wireless device detects this event and sets up the unicast channel to obtain the service.

In a transition from broadcast mode to unicast mode, one consideration may be timing of the transitions of the individual UEs that are initially receiving content in broadcast mode to receiving the content in unicast mode. If all such UEs were to attempt to transition at the same time, this may result in collisions and/or overloading the network's unicast transition capabilities. In view of this, various embodiments may incorporate various techniques to mitigate such timing issues. One example may be to use randomized switching times, in which a given UE may determine a time in which to initiate the transition by generating a random delay, e.g., using a random delay generator. Alternatively, the transition procedure may incorporate transition scheduling into signaling to the UEs to make such transitions; such signaling may occur via various network control channels. A further possible technique may be to incorporate a collision resolution technique, which may be either a distributed technique or a centralized technique.

Figure 13B:
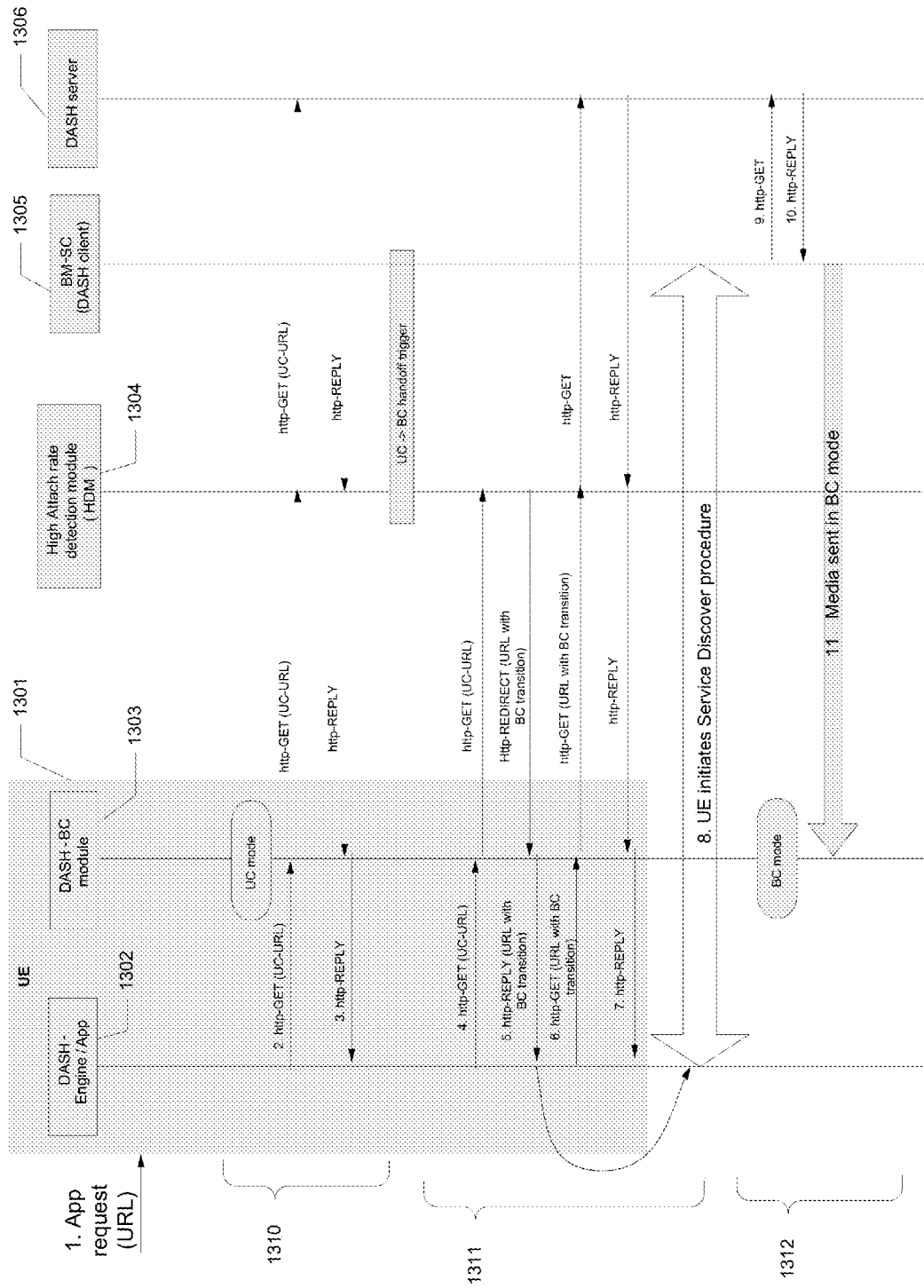

FIG. 13B illustrates an exemplary in-service signaling approach to transitioning from providing a service using separate unicast sessions to providing the service using a multicast (again, also referred to as broadcast) session, according to an embodiment of the disclosure. As noted above, FIG. 13B shows this approach in the context of DASH, but it may be applicable to RTP-based systems, as well. Components corresponding to those shown in FIG. 13A have been labeled with the same reference numerals. Additionally, various operations are also labeled with reference numerals 1-7, which are unique to FIG. 13B.

In FIG. 13B, a user of UE 1301 may request some application/service, e.g., by entering a URL (shown as "1. App request"), and the UE may initiate a unicast session 1310 to obtain the corresponding content. As discussed in conjunction with FIG. 13A, the URLs may be constructed with semantics to differentiate unicast mode from broadcast mode and to incorporate one or more indications to transition from one mode to the other. In the initial unicast mode 1310, the DASH engine 1302 may select the appropriate URL, which, as discussed above, may be obtained based on an MPD; the URL may be the URL for the unicast case, which may be designated "UC-URL." More details about how modified URLs may be obtained based on an MPD are found above. The DASH engine 1302 may then send an http-GET(UC-URL) message, as described above. Again, in unicast mode, the DASH-BC module 1303 may not process the http-GET(UC-URL) message, given that this is unicast mode. As described above, HDM 1304 may maintain counts of UEs subscribing to different multimedia services. The http-GET(UC-URL) message may reach DASH server 1306, which may respond by sending an http-REPLY message to forward a corresponding segment of the requested content. The http-REPLY is ultimately forwarded to DASH engine 1302, as described above (reference numeral 3 in FIG. 13B). Naturally, in DASH, this process may be performed repeatedly in order to obtain the requested content.

When the HDM 1304 or other network entity determines that a number of UEs requesting a given multimedia service exceeds a threshold, a transition to broadcast mode may be triggered. Various operations 1311 may be involved in implementing this transition. The UE 1301 may continue to request content by sending a further http-GET(UC-URL) message (4). However, given that the transition to broadcast has been triggered, HDM 1304 or another network element (e.g., a network element as shown in FIG. 6) may intercept the http-GET(UC-URL) message and transmit back to UE 1301 an http-REDIRECT(URL with BC transition) message (5), that may be received by DASH-BC module 1303 of UE 1301. "URL with BC transition" may be a modified version of the URL that may indicate to the UE 1301 that a transition to broadcast mode has been triggered. The modified URL may be achieved by modifying the MPD attribute (e.g., modified MPD attribute of FIG. 9I) or by inserting a string, e.g., "UCtoBC" explicitly in the http-REPLY or http-REDIRECT message sent to the wireless device in response to the http-GET request sent from the wireless device to the network. When the DASH-BC module 1303 of UE 1301 receives the http-REDIRECT with the URL with BC transition, the DASH-BC module 1303 may issue an http-GET using the redirected URL. Additionally, DASH-BC module 1303 may also prepare the wireless device to receive the content using broadcast service. Such preparation may include initiating a service discovery procedure or a procedure (e.g., to direct a receiver of the UE 1301) to receive a service announcement. DASH-BC module 1303 may forward an http-REPLY(URL with BC transition) message to DASH engine 1302. At this point, DASH engine 1302 may substitute the URL with BC transition for the UC-URL, which may indicate that the DASH engine 1302 has received the http-REDIRECT message and may continue to request content from the DASH server 1306 using an http-GET message (6). It is noted that the URL with BC transition may or may not be forwarded to DASH server 1306, as DASH server 1306 need not differentiate the unicast URL from the URL indicating the transition to broadcast mode (i.e., this may not be relevant to the DASH server 1306 being able to provide the requested content, and it may be stripped off the http-GET message, if desired). As usual, as long as such unicast-mode http-GET messages are received by DASH server 1306, DASH server 1306 may continue to send http-REPLY messages (7) that may forward requested DASH segments.

When the DASH engine 1302 receives the http-REDIRECT or http-REPLY(URL with BC transition) message (5), this may also trigger the UE 1301 to transition to broadcast mode. Accordingly, UE 1301 may initiate service discovery (8), which may be used to determine when the desired service is available in broadcast mode and to initiate the associated transition, which may be done in coordination with BM-SC 1305. Once UE 1301 has discovered and set up broadcast service, transmission of the content to UE 1301 in unicast mode may be discontinued, and broadcast mode may proceed, as previously described; this is indicated by reference numeral 1312 (which may include operations indicated by reference numerals 9-11). In some cases, the UE 1301 can fail to transition to broadcast mode after a predetermined period of time. The network can enforce the transition to broadcast delivery after the predetermined period of time if the UE 1301 continues to request the content in unicast mode. The transition can be enforced by the network sending an http-REDIRECT to a NULL URL, or sending an http error to indicate content is no longer available via unicast mode and/or is now available via broadcast mode.

Figure 13C:
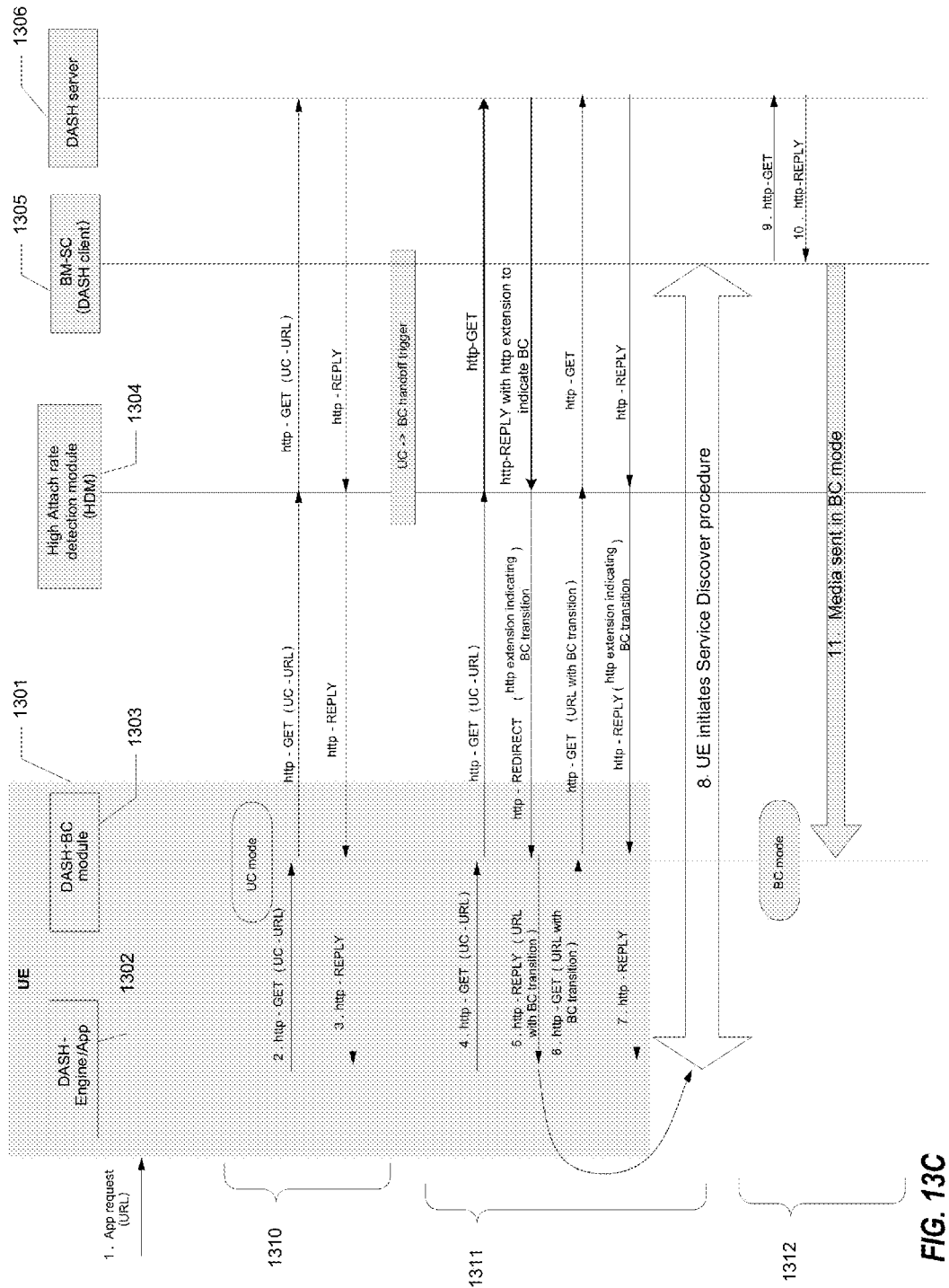

FIG. 13C presents a second in-service signaling embodiment that may be used in transitioning from unicast mode to broadcast mode. The elements of FIG. 13C and the sequences of operations in FIG. 13C may be similar to those shown in FIG. 13B, with the following modifications. During the transition 1311 from unicast to broadcast mode, as in FIG. 13B, the UE 1301 continues to request and obtain DASH segments from DASH server 1306, which may be done by the DASH engine 1302 of UE 1301. DASH engine 1302 may generate and transmit an http-GET message (4). Unlike the embodiment of FIG. 13B, in which signaling the transition to the UE 1301 may be done by means of using a modified URL, in the embodiment of FIG. 13C, an http extension may be used to indicate that the UE 1301 should transition to broadcast mode. For example, http may define various header fields for various request and/or response messages. In some embodiments, therefore, a new header field may be introduced to indicate a transition between modes (e.g., transition-to-broadcast). The new header field that indicates the service is going to soon be transmitted over broadcast may be sent to the wireless device using the http-REPLY or http-REDIRECT message that is sent in response to the http-GET request sent from the wireless device requesting the content segment. In addition, the UE 1301 continues to request further content in unicast mode, once the system has determined that a transition should be made to broadcast mode (4), and the http-GET message is not redirected, as in FIG. 13B; instead, the http-GET message may reach the DASH server 1306, which may, in response, provide an http-REPLY message that may include an http extension to indicate to the UE 1301 that the service is transitioning to broadcast mode delivery. As shown (6, 7), subsequent requests for content (in unicast mode) and associated responses from the DASH server 1306 may proceed in a similar fashion. In both cases, to enforce the transition to broadcast or multicast delivery after a predetermined period of time, the network may send an http-REDIRECT to a NULL URL, or send an http error to indicate content is no longer available via unicast mode and/or is now available via broadcast mode.

As noted above, FIGS. 13A-13C describe how transitions between broadcast and unicast modes may be accomplished using in-service signaling in a DASH-based system. However, again, this may also be applicable to other protocols for providing content, such as RTP. In the particular example of RTP, to which the disclosure is not limited, RTP messages include associated headers, and may include real-time control protocol (RTCP) signaling. Similar to the use of revised URLs and/or http extensions in DASH, revised RTCP signaling messages may be used to indicate transitions between unicast and broadcast modes, and one of skill in the art would understand that various such modifications may be made and how signaling sequences may be transmitted and processed in RTP-based systems. For example, RTCP signaling may generally include headers, and, in one example, a header may be modified to include, e.g., a "transition-to-broadcast" or "transition-to-unicast" indication.

Figure 14:
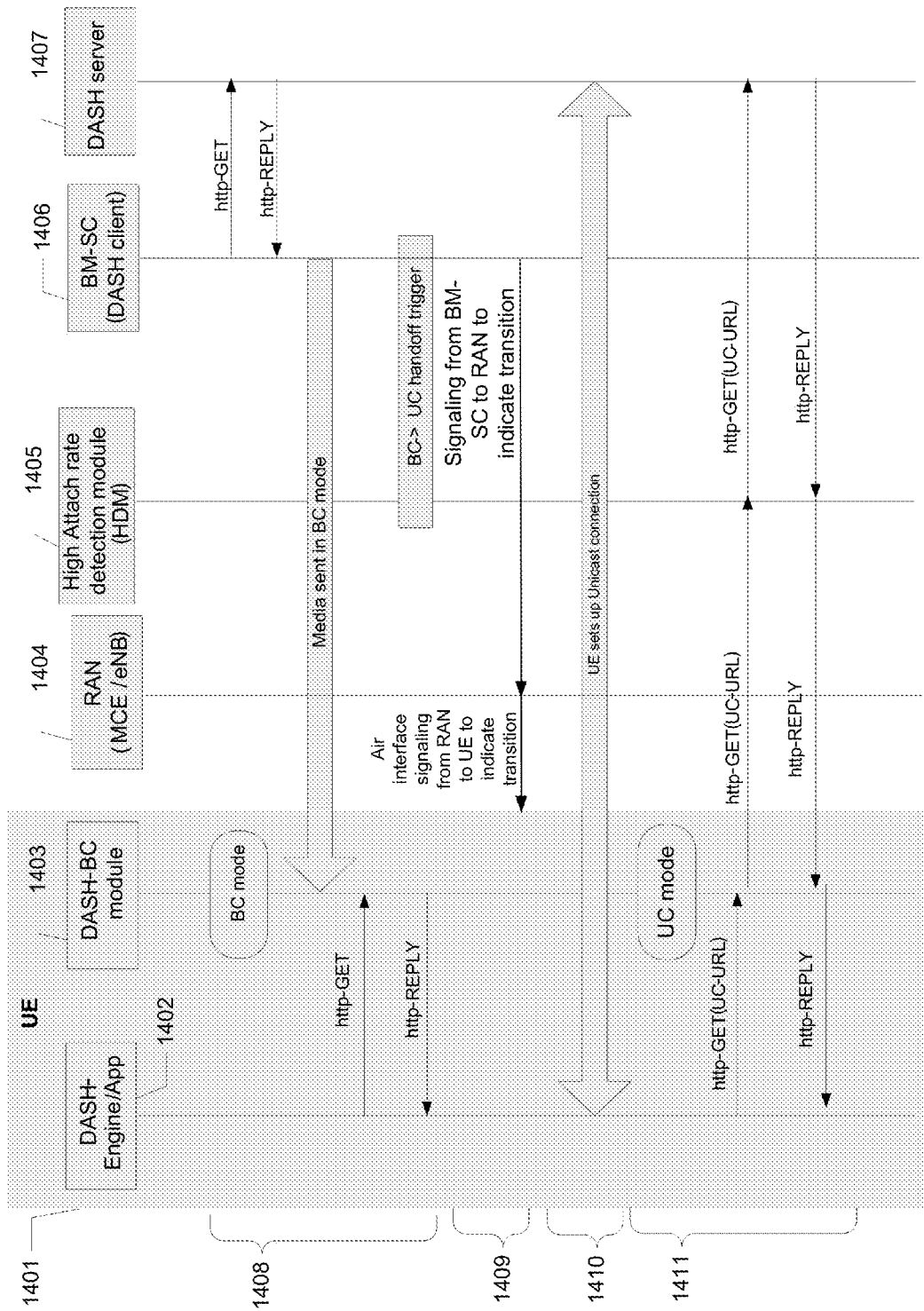

The discussion now turns to various embodiments that may utilize out-of-service signaling. FIG. 14 illustrates and exemplary embodiment of a transition from broadcast mode to unicast mode using such out-of-service signaling. Most of the components shown in FIG. 14 may correspond to components shown in FIG. 13A. In FIG. 14, UE 1401 may include DASH engine/app 1402 and DASH-BC module 1403. HDM 1405, BM-SC 1406, and DASH server 1407 may also be similar to corresponding components shown in FIG. 13A. FIG. 14 adds RAN 1404, which may comprise, for example, an MCE and/or an eNB. Reference numeral 1408 may encompass broadcast mode operations, reference numeral 1410 may refer to transition to unicast operation, and reference numeral 1411 may refer to unicast operations; these may all be similar to the operations referenced by reference numerals 1307-1309 of FIG. 13A. FIGS. 13A and 14 may differ, for example, in that, instead of using a modified URL, as described in conjunction with FIG. 13A, FIG. 14 may include an additional signal flow, indicated by reference numeral 1409. In this case, the BM-SC 1406 may generate a control signal, not sent with the content, and may send this control signal to the RAN 1404, e.g., to the MCE, to indicate that a transition to unicast mode should occur. The RAN 1404 may then send a signal to UE 1301, e.g., using air interface signaling. For example, if the control signal from the BM-SC 1406 had been sent to an MCE of RAN 1404, the MCE may then indicate to an eNB of RAN 1404 that one or more UEs (e.g., UE 1401) should be informed that the transition to unicast should be initiated. The eNB of RAN 1404 may then signal this to UE 1401, using a control channel of the wireless communications system. Such a control channel may, for example, be an MCCH. In yet another embodiment, the network may start transmitting the content on broadcast channel. The wireless device currently obtaining the content using the unicast channel may detect that the network started transmitting the same content over the broadcast channel. This can be achieved by matching the URL the wireless device is using on the unicast channel to the URL that is broadcasted using the FDT of the FLUTE protocol used to transmit the DASH segments or by monitoring the service announcement procedure. After the wireless device detects that the same service is transmitted over the broadcast channel, the unicast connection may be closed. Similarly, the service announcement can also be used to indicate to the UE a transition from unicast mode to broadcast mode. The BM-SC can add the program in the service announcement and send it on all frequency layers that support eMBMS services. The UE may receive the service announcement periodically. In the service announcement, the BM-SC may indicate the broadcast start time so that UE can establish the multicast channel when the broadcast mode starts.

Similar to FIGS. 13A-13C, FIG. 14 demonstrates a transition using an example of a DASH-based system, to which the disclosure is not limited. A similar procedure may be applicable to other protocols for providing content, such as, but not limited to RTP.

Figure 15:
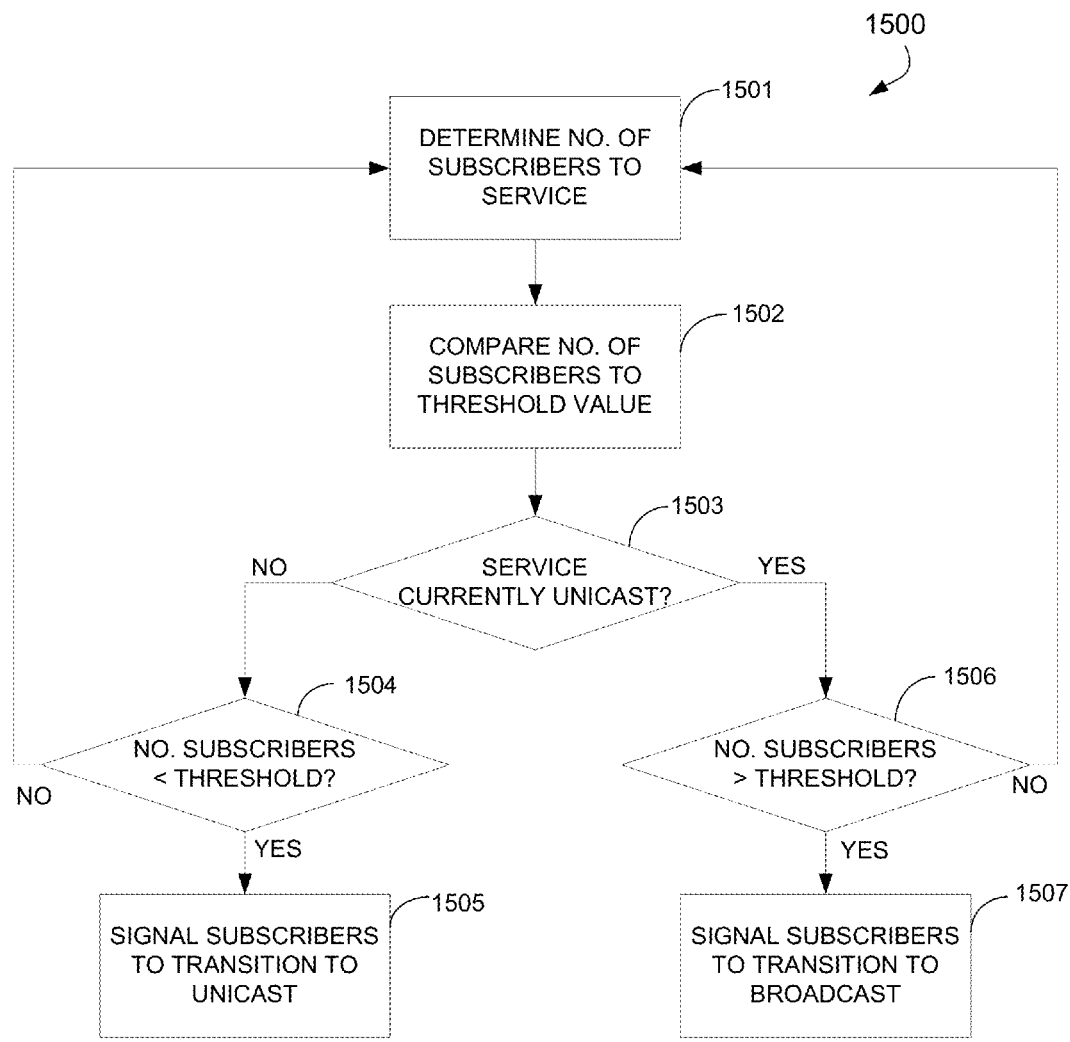
FIGS. 15 and 16 show flowcharts of methods according to various embodiments of the disclosure.
Figure 16:
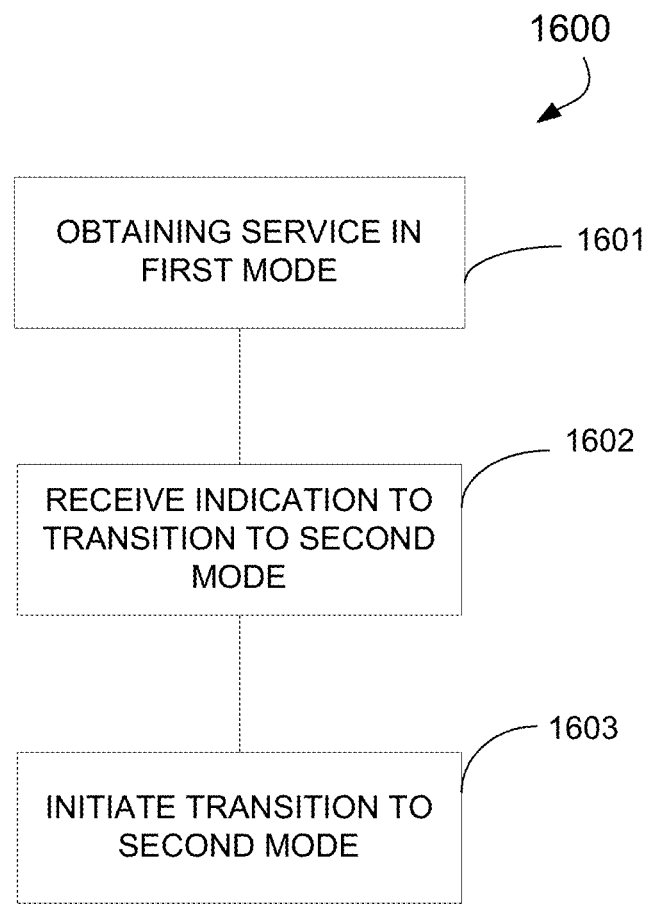

FIGS. 15 and 16 show flowcharts that may relate to various embodiments of the disclosure, which may include those discussed above in conjunction with FIGS. 13A-13C and 14. FIG. 15 shows a process 1500 that may be performed by one or more elements of a network. A number of subscribers to a given service may be determined at 1501. The number obtained may be compared to a predetermined threshold value at 1502. Depending on whether the service is presently being delivered in unicast mode or broadcast mode 1503, one of two things may happen. If the service is presently being delivered in unicast mode, and if the number of subscribers is greater than the threshold value 1506, the network may signal to subscribers to transition to delivery of the service in broadcast mode 1507. If the service is currently not being delivered in unicast mode (but rather in broadcast mode), and the number of subscribers is less than the threshold 1504, the network may signal to subscribers to transition to delivery of the service in unicast mode 1505.

Similarly, FIG. 16 shows a process 1600 that may be performed at a UE. The UE may be obtaining a given service in a first delivery mode 1601. The UE may receive from the network by which the service is being provided an indication that a transition should be made to a second delivery mode 1602. The first delivery mode may be unicast or broadcast, and the second delivery mode may be the mode (broadcast or unicast) that is not the first delivery mode. The indication may reflect a comparison of a number of subscribers to the service to a predetermined threshold by some element or elements of the network, which may then provide a transition indication based on the comparison. The UE may then initiate a transition to the second delivery mode 1603.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection may be properly termed a computer-readable medium to the extent involving non-transient storage of transmitted signals. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium, to the extent the signal is retained in the transmission chain on a storage medium or device memory for any non-transient length of time. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method comprising:
   determining a number of subscribers to a service in a wireless communication network;
   comparing the number of subscribers to a predetermined threshold value;
   determining that the service is being provided in a unicast mode and that the number of subscribers exceeds the predetermined threshold value; and
   initiating, based on determining that the service is being provided in the unicast mode and that the number of subscribers exceeds the predetermined threshold value, a transition to a multicast mode by sending the modified content designator to one or more subscribers included in the number of subscribers, to trigger a service discovery procedure, wherein the modified content designator includes a header associated with a Dynamic Adaptive Streaming over HTTP (DASH) content segment or a Real-Time Protocol (RTP) data packet.

2. The method of claim 1, wherein sending the modified content designator comprises sending at least one indication in one or more signals of a channel used to provide the service.

3. The method of claim 1, wherein the modified content designator comprises a uniform resource locator (URL) associated with the DASH content segment.

4. The method of claim 1, wherein sending the modified content designator comprises adjusting at least one protocol element or at least one header of a signal carrying the service to the one or more subscribers.

5. The method of claim 4, wherein the at least one protocol element is one of a hyper-text transport protocol (http) element or an RTP element.

6. The method of claim 4, wherein the at least one protocol element is a hyper-text transport protocol (http) element, and wherein the method further comprises using an http-REDIRECT element to trigger the service discovery procedure.

7. The method of claim 6, wherein the http-REDIRECT element includes the modified content designator including semantics designed to trigger a procedure to receive a service announcement.

8. The method of claim 5, wherein the at least one protocol element is an http element, and wherein the method further comprises using an extended http element to trigger the service discovery procedure.

9. The method of claim 1, wherein sending the modified content designator comprises sending at least one indication to the one or more subscribers via a control channel that is distinct from a channel used to provide the service to the one or more subscribers.

10. The method of claim 9, wherein the control channel comprises a multimedia control channel.

11. The method of claim 1, further comprising:
    sending a transition time instruction to at least one of the one or more subscribers.

12. The method of claim 11, wherein the transition time instruction comprises a signal scheduling a time for the at least one of the one or more subscribers to transition from the multicast mode to the unicast mode.

13. An apparatus in a wireless communication network, the apparatus comprising one or more processors configured to:
    determine a number of subscribers to a service in the wireless communication network;
    compare the number of subscribers to a predetermined threshold value;
    determine the service is being provided in a multicast mode and that the number of subscribers is below the predetermined threshold value;
    determine that the service is being provided in a unicast mode and that the number of subscribers exceeds the predetermined threshold value; and
    initiate, based on determining that the service is being provided in the unicast mode and that the number of subscribers exceeds the predetermined threshold value, a transition to a multicast mode by sending the modified content designator to one or more subscribers included in the number of subscribers, to trigger a service discovery procedure, wherein the modified content designator includes a header associated with a Dynamic Adaptive Streaming over HTTP (DASH) content segment or a Real-Time Protocol (RTP) data packet;

and further comprising at least one memory configured to store data.

14. The apparatus of claim 13, wherein, when sending the modified content designator, the one or more processors are configured to send at least one indication in one or more signals of a channel used to provide the service.

15. The apparatus of claim 13, wherein the modified content designator comprises a uniform resource locator (URL) associated with the DASH content segment.

16. The apparatus of claim 13, wherein, when sending the modified content designator, the one or more processors are configured to adjust at least one protocol element or at least one header of a signal carrying the service to the one or more subscribers.

17. The apparatus of claim 16, wherein the at least one protocol element is one of a hyper-text transport protocol (http) element or an RTP element.

18. The apparatus of claim 17, wherein the at least one protocol element is an http element, and wherein the one or more processors are further configured to use an http-REDIRECT element to trigger the service discovery procedure.

19. The apparatus of claim 18, wherein the http-REDIRECT element includes the modified content designator including semantics designed to trigger a procedure to receive a service announcement.

20. The apparatus of claim 17, wherein the at least one protocol element is an http element, and wherein the one or more processors are further configured to use an extended http element to trigger the service discovery procedure.

21. The apparatus of claim 13, wherein, when sending the modified content designator, the one or more processors are configured to send at least one indication to the one or more subscribers via a control channel that is distinct from a channel used to provide the service to the one or more subscribers.

22. The apparatus of claim 21, wherein the control channel comprises a multimedia control channel.

23. An apparatus in a wireless communication network comprising:
  means for determining a number of subscribers to a service in the wireless communication network;
  means for comparing the number of subscribers to a predetermined threshold value;
  means for determining that the service is being provided in the unicast mode and that the number of subscribers exceeds the predetermined threshold value; and
  means for initiating, based on determining that the service is being provided in the unicast mode and that the number of subscribers exceeds the predetermined threshold value, a transition to a broadcast or multicast mode by sending the modified content designator, to trigger a service discovery procedure, via the unicast mode based on a request for content of the service from one or more subscribers included in the number of subscribers when the service is currently being provided in the unicast mode, and the number of subscribers exceeds the predetermined threshold value, wherein the modified content designator includes a header associated with a Dynamic Adaptive Streaming over HTTP (DASH) content segment or a Real-Time Protocol (RTP) data packet.

24. The apparatus of claim 23, further comprising means for sending at least one indication in one or more signals of a channel used to provide the service.

25. The apparatus of claim 23, further comprising means for adjusting at least one protocol element of a signal carrying the service to the one or more subscribers, wherein the modified content designator is based on the adjusted at least one protocol element.

26. The apparatus of claim 25, wherein the at least one protocol element is an http element, and wherein the apparatus further comprises means for using an http-REDIRECT element to trigger the service discovery procedure.

27. The apparatus of claim 25, wherein the at least one protocol element is an http element, and wherein the apparatus further comprises means for using an extended http element to trigger the service discovery procedure.

28. The apparatus of claim 23, further comprising means for sending at least one indication to the one or more subscribers via a control channel that is distinct from a channel used to provide the service to the one or more subscribers.

29. A non-transitory computer-readable medium storing instruction, the instructions comprising:
  one or more instructions that, when executed by at least one processor, cause the at least one processor to:
    determine a number of subscribers to a service in a wireless communication network;
    compare the number of subscribers to a predetermined threshold value;
    determine that the service is currently being provided in a unicast mode and that the number of subscribers exceeds the predetermined threshold value; and
    initiate, based on determining that the service is being provided in the unicast mode and that the number of subscribers exceeds the predetermined threshold value, a transition to a multicast mode by sending the modified content designator to one or more subscribers included in the number of subscribers, to trigger a service discovery procedure, wherein the modified content designator includes a header associated with a Dynamic Adaptive Streaming over HTTP (DASH) content segment or a Real-Time Protocol (RTP) data packet.

30. The non-transitory computer-readable medium of claim 29, wherein the modified content designator comprises a uniform resource locator (URL) associated with the DASH content segment.

31. The non-transitory computer-readable medium of claim 29, wherein the one or more instructions to send the modified content designator comprise:
  one or more instructions to send at least one indication in one or more signals of a channel used to provide the service.

32. A method comprising:
  obtaining, at a terminal of a wireless communication network, a multimedia service in the wireless communication network, the multimedia service being provided in a first providing mode;
  receiving, by the terminal, a modified content designator, to trigger a service discovery procedure, indicating that the multimedia service is to transition from the first providing mode to a second providing mode, wherein the modified content designator includes a header associated with a Dynamic Adaptive Streaming over HTTP (DASH) content segment or a Real-Time Protocol (RTP) data packet, and wherein the modified content designator is transmitted to the terminal based on determining that the multimedia service is being provided in the first providing mode and that a number of terminals subscribing to the multimedia service satisfies a predetermined threshold value; and initiating, by the terminal, a transition from the first providing mode to the second providing mode, based on receiving the modified content designator.

33. The method of claim 32, wherein the first providing mode is a unicast mode and the second providing mode is a broadcast mode.

34. The method of claim 32, wherein the modified content designator comprises a uniform resource locator (URL).

35. The method of claim 32, wherein receiving the modified content designator comprises receiving at least one adjusted version of at least one protocol element or at least one header of a signal carrying the multimedia service to the terminal.

36. The method of claim 35, wherein the at least one protocol element is one of a hyper-text transport protocol (http) element or an RTP element.

37. The method of claim 32, wherein the modified content designator is received via a multimedia control channel.

38. The method of claim 32, further comprising:
determining a transition time wherein the terminal is to transition from the first providing mode to the second providing mode.

39. The method of claim 38, wherein the transition time is determined by generating a random delay at the terminal.

40. A terminal for use in a wireless communication network, the terminal comprising at least one processor configured to:
obtain a multimedia service in the wireless communication network, the multimedia service being provided in a first providing mode;
receive a modified content designator, to trigger a service discovery procedure, indicating that the multimedia service is to transition from the first providing mode to a second providing mode, wherein the modified content designator includes a header associated with a Dynamic Adaptive Streaming over HTTP (DASH) content segment or a Real-Time Protocol (RTP) data packet, and wherein the modified content designator is transmitted to the terminal based on determining that the multimedia service is being provided in the first providing mode and that a number of terminals subscribing to the multimedia service satisfies a predetermined threshold value; and
initiate a transition from the first providing mode to the second providing mode, based on receiving the modified content designator; and
the terminal further comprising at least one memory configured to store data.

41. The terminal of claim 40, wherein the first providing mode is a unicast mode and the second providing mode is a broadcast mode.

42. The terminal of claim 40, wherein the modified content designator comprises a uniform resource locator (URL).

43. The terminal of claim 40, wherein, when receiving the modified content designator, the at least one processor is configured to receive an adjusted version of at least one protocol element or at least one header of a signal carrying the multimedia service to the terminal.

44. A terminal for use in a wireless communication network, the terminal comprising:
means for obtaining a multimedia service in the wireless communication network, the multimedia service being provided in a first providing mode;
means for receiving a modified content designator, to trigger a service discovery procedure, indicating that the multimedia service is to transition from the first providing mode to a second providing mode, wherein the modified content designator includes a header associated with a Dynamic Adaptive Streaming over HTTP (DASH) content segment or a Real-Time Protocol (RTP) data packet, and wherein the modified content designator is transmitted to the terminal based on determining that the multimedia service is being provided in the first providing mode and that a number of terminals subscribing to the multimedia service satisfies a predetermined threshold value; and
means for initiating, by the terminal, a transition from the first providing mode to the second providing mode, based on receiving the modified content designator.

45. The terminal of claim 44, wherein the first providing mode is a unicast mode and the second providing mode is a broadcast mode.

46. The terminal of claim 44, wherein the means for receiving the modified content designator comprises means for receiving at least one adjusted version of at least one protocol element or at least one header of a signal carrying the service to the terminal.

47. A non-transitory computer-readable medium storing instruction, the instructions comprising:
one or more instructions that, when executed by a terminal of a wireless communication network, cause the terminal to:
obtain a multimedia service in the wireless communication network, the multimedia service being provided in a first providing mode;
receive a modified content designator, to trigger a service discovery procedure, indicating that the multimedia service is to transition from the first providing mode to a second providing mode, wherein the modified content designator includes a header associated with a Dynamic Adaptive Streaming over HTTP (DASH) content segment or a Real-Time Protocol (RTP) data packet, and wherein the modified content designator is transmitted to the terminal based on determining that the multimedia service is being provided in the first providing mode and that a number of terminals subscribing to the multimedia service satisfies a predetermined threshold value; and
initiate a transition from the first providing mode to the second providing mode, based on the modified content designator.

48. The non-transitory computer-readable medium of claim 47, wherein the first providing mode is a unicast mode, and wherein the second providing mode is a broadcast mode.

49. The non-transitory computer-readable medium of claim 47, wherein the modified content designator comprises a uniform resource locator (URL).

* * * * *